(12) United States Patent
Kim et al.

(10) Patent No.: US 11,707,175 B2
(45) Date of Patent: Jul. 25, 2023

(54) MOVING APPARATUS FOR CLEANING, COLLABORATIVE CLEANING SYSTEM, AND METHOD OF CONTROLLING THE SAME

(71) Applicant: Samsung Electronics Co., Ltd., Suwon-si (KR)

(72) Inventors: Injoo Kim, Suwon-si (KR); Jeayun So, Suwon-si (KR); Jinhee Kim, Suwon-si (KR); Dongmin Shin, Suwon-si (KR); Sangsik Yoon, Suwon-si (KR); Jusang Lee, Suwon-si (KR); Hwan Chang, Suwon-si (KR); Junpyo Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 387 days.

(21) Appl. No.: 16/959,485

(22) PCT Filed: Dec. 19, 2018

(86) PCT No.: PCT/KR2018/016258
§ 371 (c)(1),
(2) Date: Jul. 1, 2020

(87) PCT Pub. No.: WO2019/135518
PCT Pub. Date: Jul. 11, 2019

(65) Prior Publication Data
US 2021/0068605 A1     Mar. 11, 2021

(30) Foreign Application Priority Data

Jan. 3, 2018   (KR) .................. 10-2018-0000917

(51) Int. Cl.
*A47L 9/28* (2006.01)
*G05B 19/4155* (2006.01)
(Continued)

(52) U.S. Cl.
CPC .......... *A47L 9/2852* (2013.01); *A47L 9/2857* (2013.01); *A47L 9/2894* (2013.01);
(Continued)

(58) Field of Classification Search
CPC .... A47L 9/2852; A47L 9/2857; A47L 9/2894; A47L 2201/022; A47L 2201/04;
(Continued)

(56) References Cited

U.S. PATENT DOCUMENTS 6,629,028 B2 * 9/2003 Paromtchik .......... G05D 1/0236
701/28
6,690,134 B1   2/2004 Jones et al.
(Continued)

FOREIGN PATENT DOCUMENTS

CN         1434359 A      8/2003
CN       103479303 A      1/2014
(Continued)

OTHER PUBLICATIONS

Korean Office Action dated May 9, 2022 from Korean Application No. 10-2018-0000917.
(Continued)

*Primary Examiner* — Bhavesh V Amin
(74) *Attorney, Agent, or Firm* — Staas & Halsey LLP

(57) ABSTRACT

The disclosure relates to a moving apparatus for cleaning, a collaborative cleaning system, and a method of controlling the same, the moving apparatus for cleaning including: a cleaner configured to perform cleaning; a traveler configured to move the moving apparatus; a communicator configured to communicate with an external apparatus; and a processor configured to identify an individual cleaning region corresponding to the moving apparatus among a plurality of individual cleaning regions assigned to the moving apparatus and at least one different moving apparatus based on
(Continued)

current locations throughout a whole cleaning region, based on information received through the communicator, and control the traveler and the cleaner to travel and clean the identified individual cleaning region. Thus, the individual cleaning regions are assigned based on the location information about the plurality of cleaning robots, and a collaborative clean is efficiently carried out with a total shortened cleaning time.

16 Claims, 17 Drawing Sheets

(51) Int. Cl.
- *G05D 1/00* (2006.01)
- *G05D 1/02* (2020.01)
- *G06F 3/04842* (2022.01)

(52) U.S. Cl.
CPC ....... *G05B 19/4155* (2013.01); *G05D 1/0016* (2013.01); *G05D 1/0219* (2013.01); *G05D 1/0225* (2013.01); *G05D 1/0291* (2013.01); *G06F 3/04842* (2013.01); *A47L 2201/022* (2013.01); *A47L 2201/04* (2013.01); *G05B 2219/45098* (2013.01); *G05D 2201/0215* (2013.01)

(58) Field of Classification Search
CPC ............... A47L 11/4011; A47L 9/2873; G05B 19/4155; G05B 2219/45098; G05D 1/0016; G05D 1/0219; G05D 1/0225; G05D 1/0291; G05D 2201/0215; G05D 1/0044; G06F 3/04842; B25J 11/0085; B25J 9/1664; B25J 9/1682; B25J 13/06

See application file for complete search history.

(56) References Cited

U.S. PATENT DOCUMENTS

| | | | |
|---|---|---|---|
| 7,861,366 B2* | 1/2011 | Hahm | A47L 9/009 15/328 |
| 8,428,777 B1* | 4/2013 | Poursohi | G05B 19/41865 700/247 |
| 8,755,936 B2* | 6/2014 | Friedman | G05D 1/0297 901/8 |
| 8,830,057 B1* | 9/2014 | Poursohi | B25J 9/1671 700/245 |
| 9,008,839 B1* | 4/2015 | Kuffner, Jr. | G05B 19/4187 700/248 |
| 9,026,248 B1* | 5/2015 | Hickman | G05B 19/418 700/248 |
| 9,468,349 B2* | 10/2016 | Fong | B25J 9/1664 |
| 9,538,892 B2* | 1/2017 | Fong | B25J 9/1664 |
| 9,606,543 B2* | 3/2017 | Jeon | A47L 11/24 |
| 10,173,320 B1* | 1/2019 | Prisament | G05B 23/0227 |
| 10,335,004 B2* | 7/2019 | Fong | B25J 13/006 |
| 11,019,972 B2* | 6/2021 | Lee | A47L 11/4044 |
| 2002/0153185 A1* | 10/2002 | Song | A47L 9/2894 180/167 |
| 2005/0156562 A1* | 7/2005 | Cohen | G05D 1/0225 320/107 |
| 2007/0050084 A1* | 3/2007 | Song | A47L 9/2852 700/245 |
| 2007/0142964 A1* | 6/2007 | Abramson | A47L 9/2852 700/245 |
| 2009/0198376 A1* | 8/2009 | Friedman | G08C 17/00 700/248 |
| 2010/0145514 A1* | 6/2010 | Kim | B25J 9/161 700/248 |
| 2010/0174436 A1* | 7/2010 | Matsunaga | B25J 9/1664 701/26 |
| 2010/0217438 A1* | 8/2010 | Kawaguchi | B25J 9/1661 700/248 |
| 2012/0106829 A1* | 5/2012 | Lee | G05D 1/0274 382/153 |
| 2013/0326839 A1 | 12/2013 | Cho et al. | |
| 2014/0100693 A1* | 4/2014 | Fong | B25J 11/0085 700/253 |
| 2014/0207280 A1* | 7/2014 | Duffley | A47L 9/2857 700/257 |
| 2014/0343757 A1* | 11/2014 | Liu | G05D 1/028 701/2 |
| 2015/0000068 A1* | 1/2015 | Tsuboi | G05B 19/18 901/1 |
| 2015/0148951 A1* | 5/2015 | Jeon | A47L 11/24 901/30 |
| 2015/0182088 A1 | 7/2015 | Kim et al. | |
| 2015/0375395 A1 | 12/2015 | Kwon et al. | |
| 2016/0091899 A1* | 3/2016 | Aldred | B60L 53/14 901/1 |
| 2016/0135655 A1* | 5/2016 | Ahn | G05D 1/0044 15/319 |
| 2016/0143500 A1* | 5/2016 | Fong | B25J 9/1697 901/1 |
| 2017/0105592 A1* | 4/2017 | Fong | B25J 11/0085 |
| 2017/0175413 A1 | 6/2017 | Curlander et al. | |
| 2017/0265703 A1* | 9/2017 | Park | B25J 9/16 |
| 2018/0317725 A1* | 11/2018 | Lee | B25J 11/0085 |

FOREIGN PATENT DOCUMENTS

| | | |
|---|---|---|
| CN | 104739320 A | 7/2015 |
| CN | 106037589 A | 10/2016 |
| CN | 106793905 A | 5/2017 |
| DE | 10 2008 014 912 A1 | 9/2009 |
| JP | 2006-235878 | 9/2006 |
| KR | 10-2012-0058945 | 6/2012 |
| KR | 10-1178847 | 8/2012 |
| KR | 10-2012-0126772 | 11/2012 |
| KR | 10-1309527 | 9/2013 |
| KR | 10-2014-0017216 | 2/2014 |
| KR | 10-1450843 | 10/2014 |
| KR | 10-2015-0044562 | 4/2015 |
| KR | 10-2015-0061398 | 6/2015 |
| KR | 10-2015-0075639 | 7/2015 |
| KR | 10-1605994 | 3/2016 |
| KR | 10-1641022 | 7/2016 |
| KR | 10-1647757 | 8/2016 |
| KR | 10-2017-0003624 | 1/2017 |
| KR | 10-2017-0021176 | 2/2017 |
| KR | 10-2017-0071443 | 6/2017 |

OTHER PUBLICATIONS

International Search Report dated Apr. 12, 2019 from International Application No. PCT/KR2018/016258, 4 pages.
Extended European Search Report dated Feb. 25, 2021 in corresponding European Application No. 18898202.9.
Office Action dated Dec. 6, 2022 in European Patent Application No. 18 898 202.9 (6 pages).
Office Action dated Feb. 9, 2023 in Chinese Patent Application No. 201880084910.9 (9 pages; 9 pages English translation).

* cited by examiner

MOVING APPARATUS FOR CLEANING, COLLABORATIVE CLEANING SYSTEM, AND METHOD OF CONTROLLING THE SAME

CROSS-REFERENCE TO RELATED APPLICATIONS

This application is a U.S. National Stage Application which claims the benefit under 35 U.S.C. § 371 of International Patent Application No. PCT/KR2018/016258 filed on Dec. 19, 2018, which claims foreign priority benefit under 35 U.S.C. § 119 of Korean Patent Application No. 10-2018-0000917 filed on Jan. 3, 2018 in the Korean Intellectual Property Office, the contents of each of which are incorporated herein by reference.

TECHNICAL FIELD

The disclosure relates to a moving apparatus for cleaning, a collaborative cleaning system, and a method of controlling the same, and more particularly to a moving apparatus for autonomously moving and cleaning a floor, a collaborative cleaning system, and a method of controlling the same.

BACKGROUND ART

A cleaning robot and the like moving apparatus for cleaning refers to an electronic apparatus that includes a cleaning module for cleaning a predetermined ground such as a floor at home, and a moving module for moving on the ground, and moves and cleans the ground autonomously.

The cleaning robot is controlled to avoid collision with an obstacle on a traveling path while traveling on the floor within a cleaning zone, and uniformly clean the cleaning zone.

However, two or more cleaning robots may travel for a collaborative clean within one cleaning zone. In this case, a plurality of cleaning robots needs to be controlled to efficiently divide and clean the cleaning zone in consideration of a structure of a room, a history of a clean, a status of a cleaning robot, etc.

DISCLOSURE

Technical Problem

The disclosure is conceived to solve the above-described problems, and the disclosure provides a moving apparatus for cleaning, a collaborative cleaning system, and a method of controlling the same, in which a plurality of cleaning robots can efficiently perform a collaborative clean while communicating with one another within a cleaning space.

Further, the disclosure provides a moving apparatus for cleaning, a collaborative cleaning system, and a method of controlling the same, in which a plurality of cleaning robots are assigned with individual cleaning regions automatically or in response to a user input based on various conditions including their location information, thereby shortening a cleaning time and carrying out an efficient collaborative clean.

Technical Solution

According to an embodiment of the disclosure, a moving apparatus for cleaning includes: a cleaner configured to perform cleaning; a traveler configured to move the moving apparatus; a communicator configured to communicate with an external apparatus; and a processor configured to identify an individual cleaning region corresponding to the moving apparatus among a plurality of individual cleaning regions assigned to the moving apparatus and at least one different moving apparatus based on current locations throughout a whole cleaning region, based on information received through the communicator, and control the traveler and the cleaner to travel and clean the identified individual cleaning region. Thus, the individual cleaning regions are assigned based on the location information about the plurality of cleaning robots, and a collaborative clean is efficiently carried out with a total shortened cleaning time.

Each current location of the moving apparatus and at least one different moving apparatus may correspond to a location of a charging station. Thus, the cleaning robot being charged can receive a command to perform the collaborative clean.

The processor may be configured to identify the current location of the moving apparatus based on data obtained by a detector for detecting an environment around the moving apparatus. Thus, even when the start location of the cleaning robot is not fixed, the location is identified to thereby carry out an efficient collaborative clean.

The processor may be configured to map the current locations of the moving apparatus and the at least one different moving apparatus on a map including the whole cleaning region, and controls the plurality of individual cleaning regions to be assigned based on the mapping current locations. Thus, it is easy to identify the current locations of the cleaning robots based on the map.

The processor may be configured to generate a first map based on data obtained by a detector for detecting an environment around the moving apparatus, and map the current locations of the moving apparatus and the at least one different moving apparatus on the generated first map. Thus, the map generated by the sensor provided in at least one cleaning robot performing the collaborative clean is used in identifying the location.

The processor may be configured to: generate a merged map by receiving a second map including an individual cleaning region corresponding to the at least one different moving apparatus, and merging the received second map and the first map, and control the plurality of individual cleaning regions to be assigned based on the merged map. Thus, the maps generated by two or more cleaning robots are merged to obtain the map of the whole cleaning region.

When the clean of the identified individual cleaning region is finished, the processor may be configured to control the traveler so that the moving apparatus can move to and clean another individual cleaning region or move to the charging station, based on status information of at least one different moving apparatus received through the communicator. Thus, the collaborative clean is efficiently carried out by taking the current status of the cleaning robot into account.

According to an embodiment of the disclosure, a collaborative cleaning system includes: a plurality of moving apparatuses for cleaning; and a terminal apparatus, the terminal apparatus including: a communicator configured to communicate with the plurality of moving apparatuses; and a processor configured to assign a plurality of individual cleaning regions based on current locations of the plurality of moving apparatuses, throughout a whole cleaning region, based on information received through the communicator, and control a command, which is issued to clean the individual cleaning regions assigned to the plurality of moving apparatuses, to be transmitted through the communicator. Thus, the individual cleaning regions are assigned based on the location information about the plurality of cleaning robots, and a collaborative clean is efficiently carried out with a total shortened cleaning time.

The terminal apparatus may further include a display configured to display a user interface (UI), and the processor may be configured to control the plurality of individual cleaning regions to be assigned to the plurality of moving apparatuses based on a user input to the UI. The UI may include a plurality of items to input a setting value for assigning the individual cleaning regions to the plurality of moving apparatuses. Thus, it is possible to assign the individual cleaning region through the UI of the terminal apparatus, thereby improving convenience for a user.

The processor may be configured to display a map of the whole cleaning region on the display, and assign the plurality of individual cleaning regions to the plurality of moving apparatuses based on a user input to the displayed map. Thus, the map allows a user to easily identify the current locations of the cleaning robots, and it is thus possible to more efficiently divide the cleaning region.

The processor may be configured to generate a map of the whole cleaning region based on data received from at least one moving apparatus through the communicator. The processor may be configured to receive location information from the plurality of moving apparatuses through the communicator, and control the display to map and display the received location information on the map. Thus, the map, which is generated using the sensor provided in at least one cleaning robot for performing the collaborative clean, is used in dividing the cleaning region.

The display may be configured to display a UI to set priority with regard to the plurality of moving apparatuses for cleaning, and the processor may be configured to transmit priority information set through the UI to a matching moving apparatus through the communicator. Thus, the collaborative clean is achieved by the prioritized cleaning robot having priority with regard to a predetermined cleaning region, and it is thus possible to efficiently share the collaborative clean between the cleaning robots.

According to an embodiment of the disclosure, a collaborative clean control method of a plurality of moving apparatuses for cleaning includes: assigning a plurality of individual cleaning regions to the plurality of moving apparatuses capable of communicating with one another based on current locations; and allowing the plurality of moving apparatuses to travel and clean the assigned individual cleaning region. Thus, the individual cleaning regions are assigned based on the location information about the plurality of cleaning robots, and a collaborative clean is efficiently carried out with a total shortened cleaning time.

Each current location of the plurality of moving apparatuses may corresponds to a location of a charging station. The method may further include identifying the current locations by the plurality of moving apparatuses based on data obtained by a detector provided in at least one moving apparatus. Thus, it is possible to efficiently control the collaborative clean based on the current location regardless of whether the start location of the cleaning robot is fixed or flexile.

The method may further include generating a map based on data obtained by a detector provided in at least one moving apparatus; and mapping the current locations of the plurality of moving apparatuses on the generated map. The generation of the map may include receiving a map including the matching individual cleaning region from two or more moving apparatuses; and generating a merged map by merging the received maps of the individual cleaning regions. Thus, the map is used to more efficiently divide the cleaning region.

The assignment of the plurality of individual cleaning regions may comprise assigning the plurality of individual cleaning regions through the UI displayed on the terminal apparatus capable of communicating with the plurality of moving apparatuses. Thus, it is more convenient for a user.

Advantageous Effects

As described above, there are provided a moving apparatus for cleaning, a collaborative cleaning system, and a method of controlling the same, in which a plurality of cleaning robots are assigned with individual cleaning regions based on their location information, thereby having effects on shortening a total cleaning time and achieving an effective collaborative clean.

BEST MODE

Below, embodiments of the disclosure will be described in detail with reference to accompanying drawings. In the following descriptions of the embodiments with matters illustrated in the accompanying drawings, like numerals or symbols refer to like elements having substantially the same functions.

In the disclosure, at least one among a plurality of elements refers to not only all the plurality of elements but also both each one of the plurality of elements excluding the other elements or a combination thereof.

Figure 1:
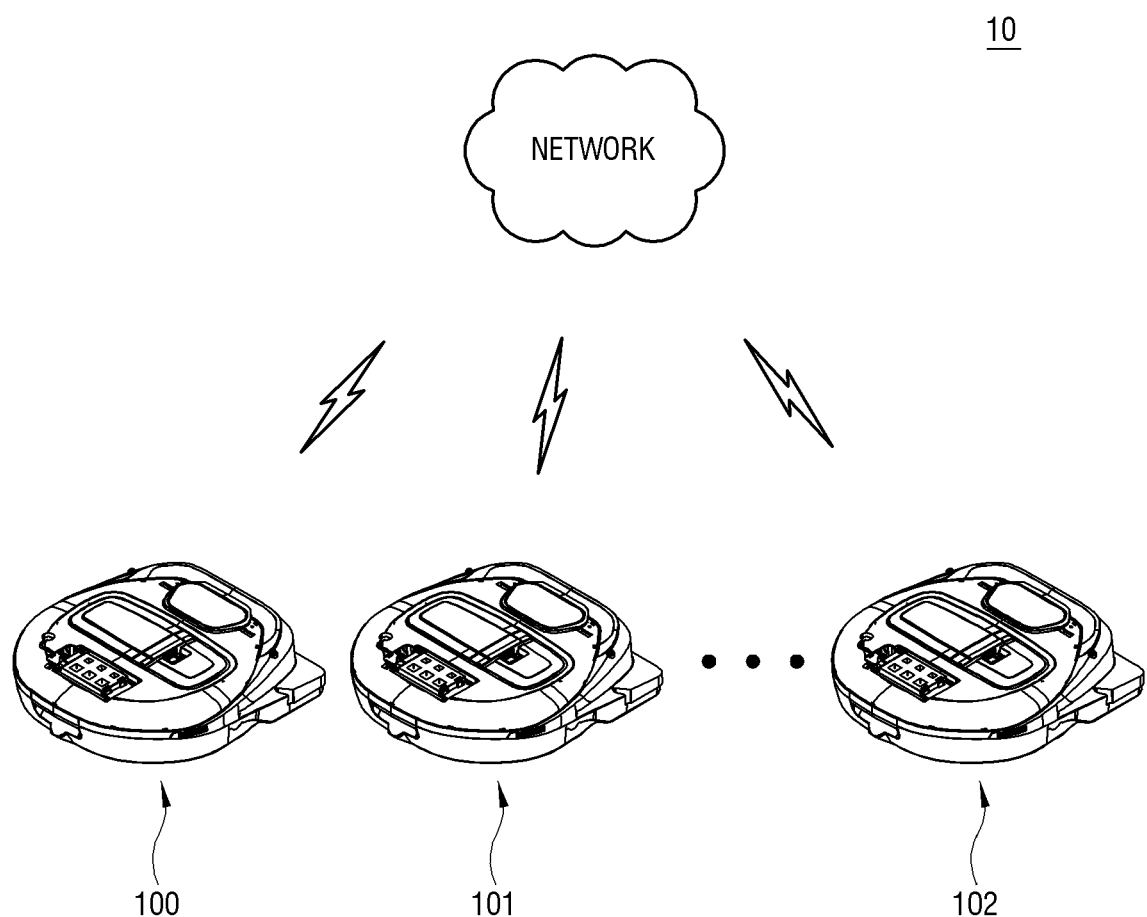
FIG. 1 illustrates a collaborative cleaning system according to an embodiment of the disclosure.

FIG. 1 illustrates a collaborative cleaning system according to an embodiment of the disclosure.

As shown in FIG. 1, a collaborative cleaning system 10 according to an embodiment of the disclosure includes a plurality of cleaning robots 100, 101, . . . , 102 which can communicate with one another through a network.

According to an embodiment, the plurality of cleaning robots 100, 101, . . . , 102 perform communication with one another through a predetermined network. The network shown in FIG. 1 refers to a private network accessible to a wide area network, i.e. a public network, and may include a gateway to which a predetermined address is allocated, and a router or the like access point (AP).

The plurality of cleaning robots 100, 101, . . . , 102 includes a communicator (see '110' in FIG. 4) for communication with one another. As an example of the communicator, there is a Wi-Fi communication module.

Alternatively, the plurality of cleaning robots 100, 101, . . . , 102 may perform direct communication with one another without the AP. In this case, the communicator 110 provided in the plurality of cleaning robots 100, 101, . . . , 102 may include at least one of communication modules based on Bluetooth, Bluetooth low energy, infrared data association (IrDA), Wi-Fi Direct, Zigbee, ultra wideband (UWB), near field communication (NFC), long term evolution (LTE), etc.

The collaborative cleaning system 10 of FIG. 1 may further include a server (not shown) configured to communicate with the plurality of cleaning robots 100, 101, . . . , 102. Here, the server may be connected via the public network to which the network is accessible, and includes a cloud server. The server receives data including location information from the plurality of cleaning robots 100, 101, . . . , 102, and control the cleaning robots 100, 101, . . . , 102 to collaboratively clean a cleaning region based on the received data.

Figure 2:
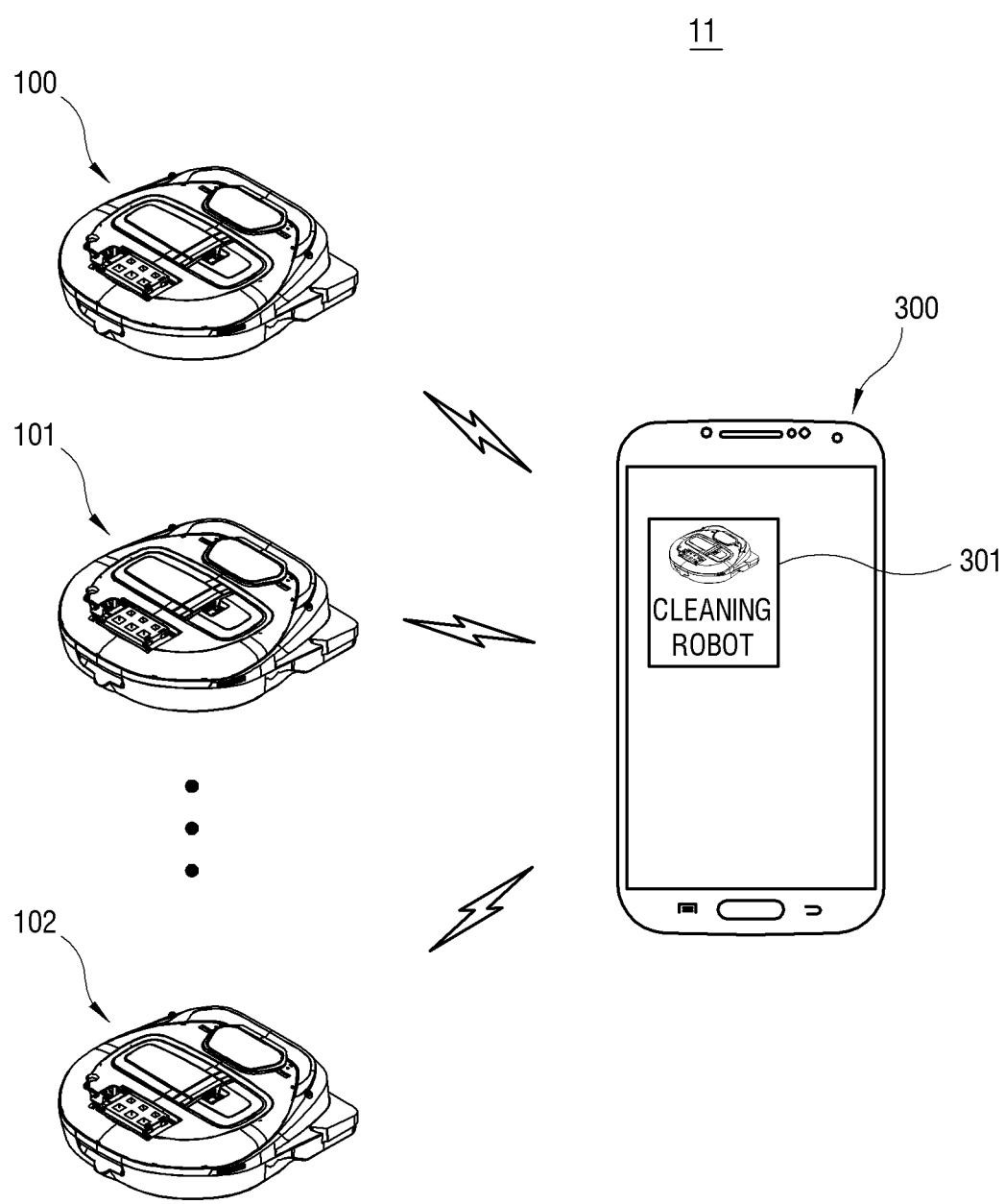
FIG. 2 illustrates a collaborative cleaning system according to another embodiment of the disclosure.

FIG. 2 illustrates a collaborative cleaning system according to another embodiment of the disclosure.

As shown in FIG. 2, a collaborative cleaning system 11 according to another embodiment of the disclosure further includes a terminal apparatus 300 as compared with the foregoing embodiment.

The plurality of cleaning robots 100, 101, . . . , 102 may communicate with one another through the AP or directly as described in the foregoing embodiment.

According to an embodiment, the terminal apparatus 300 may be embodied by a mobile device such as a cellular phone, a smart phone, a tablet computer or the like smart pad, etc. In this embodiment, the terminal apparatus 300 may be embodied by a personal computer (PC) including a laptop or desktop computer. Alternatively, the terminal apparatus 300 may be embodied by a television (TV) such as a smart TV. In other words, the terminal apparatus 300 in the collaborative cleaning system 11 according to the disclosure includes various apparatuses having a display (see '330' in FIG. 5) and allowing a user to make an input.

The terminal apparatus 300 is installed with at least one program, i.e. a cleaning robot application that provides services for managing and controlling the plurality of cleaning robots 100, 101, . . . , 102. This application may be distributed by a cleaning robot manufacturer and the like, released as being embedded while the terminal apparatus 300 is manufactured, or downloaded from an App store and the like market and installed in the terminal apparatus 300.

A user may use the program installed in the terminal apparatus 300 to monitor the statuses of the plurality of cleaning robots 100, 101, . . . , 102, and control the cleaning robots 100, 101, . . . , 102 to carry out a proper collaborative clean. For example, through the program installed in the terminal apparatus 300, a user may assign the plurality of cleaning robots 100, 101, . . . , 102 with the individual cleaning regions, and make a user input for transmitting a control signal including a command issued to control the cleaning robots 100, 101, . . . , 102 to clean their assigned regions. Here, the control signal is transmitted to the plurality of cleaning robots 100, 101, . . . , 102 through a predetermined network or directly.

The collaborative cleaning system 11 of FIG. 2 may further include a server (not shown) configured to communicate with the plurality of cleaning robots 100, 101, . . . , 102 and the terminal apparatus 300. According to an embodiment, the server may be accessed by the same user account as the terminal apparatus 300.

In the foregoing collaborative cleaning systems 10 and 11 according to the embodiments of the disclosure, each of the cleaning robots 100, 101, . . . , 102 refers to a moving apparatus that autonomously moves and performs a predetermined operation, and an auxiliary apparatus is additionally provided to assist the moving apparatus in the operation in a state that the auxiliary apparatus is separated from the moving apparatus and installed at a predetermined stationary location.

Figure 3:
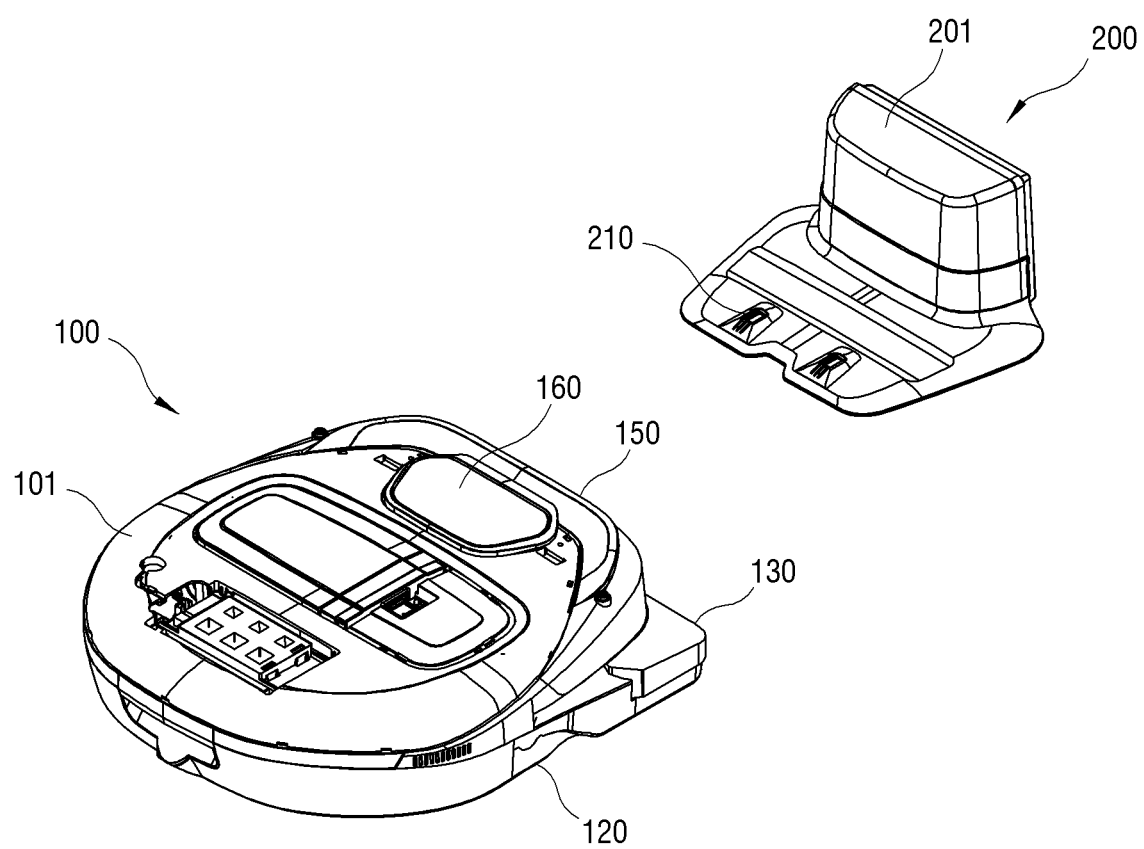
FIG. 3 is a perspective view of a moving apparatus for cleaning according to an embodiment of the disclosure.
Figure 4:
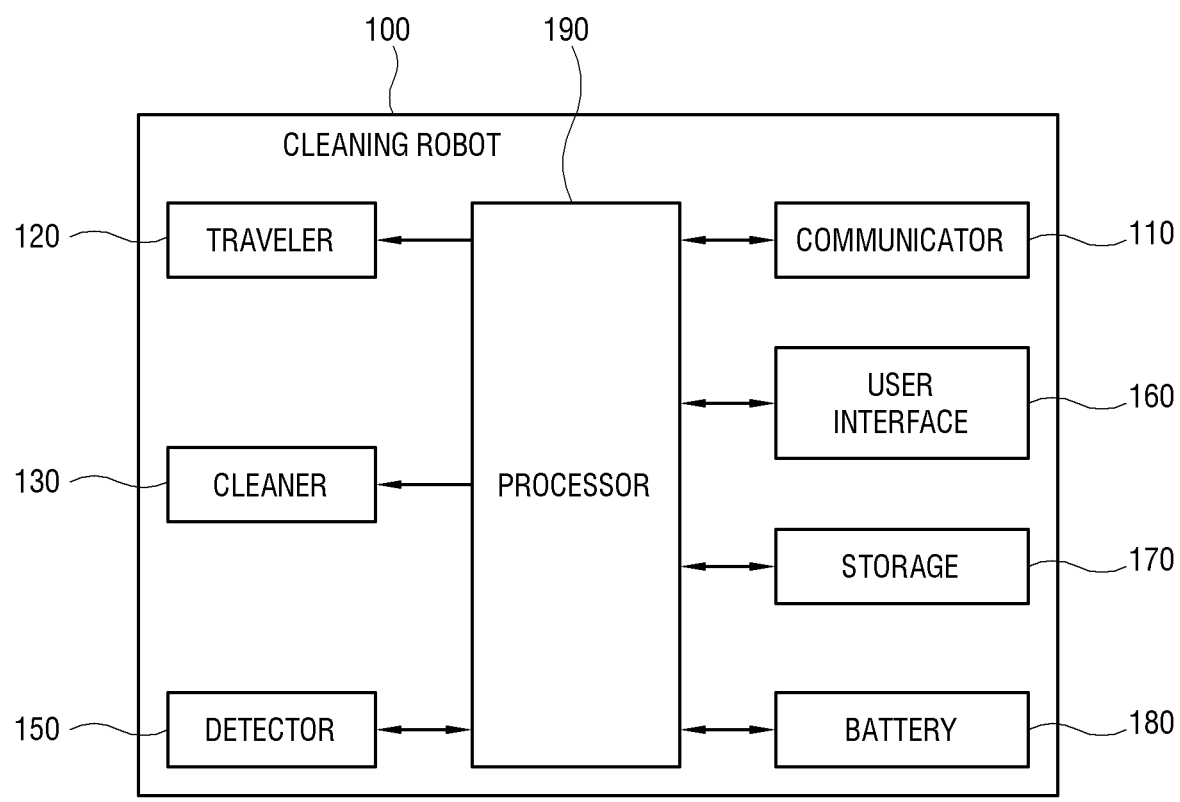
FIG. 4 is a block diagram of the moving apparatus for cleaning in FIG. 3.

FIG. 3 is a perspective view of a moving apparatus for cleaning according to an embodiment of the disclosure, and FIG. 4 is a block diagram of the moving apparatus for cleaning in FIG. 3.

The shape and configuration of the moving apparatus 100 for cleaning in FIGS. 3 and 4 are applied to all the cleaning robots in the systems 10 and 11 as well as the cleaning robots 101 and 102 shown in FIGS. 1 and 2.

In this embodiment shown in FIG. 3, the moving apparatus for cleaning refers to a cleaning robot 100, which autonomously moves and cleans a floor within an area of a predetermined range, and the auxiliary apparatus refers to a charging apparatus 200 provided as a charging station (hereinafter, referred to as a docking station or a base station), which charges a battery of the cleaning robot 100. However, there are no limits to each scheme for embodying the moving apparatus and the auxiliary apparatus to which the concept of the disclosure is applied, and various kinds of apparatuses as well as the cleaning robot 100 and the charging apparatus 200 may be embodied as the moving apparatus or the auxiliary apparatus.

In an embodiment, the cleaning robot 100 may be embodied by an autonomous traveling apparatus that includes a detector 150 capable of detecting ambient environments, recognizes its own location and moves to a destination.

The cleaning robot 100 as shown in FIG. 3 includes a main body 101 forming an outer appearance and installed with general elements, a traveler 120 moving the cleaning robot 100 in a predetermined direction, a cleaner 130 cleaning a floor as the cleaning robot 100 moves, and a detector 150 detecting an environment around the cleaning robot 100. The foregoing elements are some elements, which are provided outside the main body 101, among all the elements of the cleaning robot 100.

Driving power for the general operations of the cleaning robot 100 such as the traveler 120 and the cleaner 130 is given by a built-in battery (see '180' in FIG. 4) of the main body 101, and the cleaning robot 100 is provided with a charging terminal for charging the battery 180.

To move the cleaning robot 100, the traveler 120 basically includes one or more wheels to be in contact with on a floor, a motor used as a driver for generating the driving power for the movement, and a link and shaft structure for transferring the driving power of the motor to the wheels.

The traveler 120 includes a plurality of wheels, which are individually driven, so that the cleaning robot 100 can have various movements such as a forward movement, a backward movement, a turning movement, a stationary movement, etc. The moving direction and speed of the cleaning robot 100, caused by the traveler 120, are determined by a control signal transmitted from a processor (see '190' in FIG. 4) in the cleaning robot 100 to the motor.

According to an embodiment, the traveler 120 may further include a steering device for physically changing each angle of a plurality of wheels in response to a control signal of the processor 190.

According to an alternative embodiment, each number of revolutions of the plurality of wheels in the traveler 120 may be controlled in response to a control signal of the processor 190, so that the moving cleaning robot 100 can be subjected to traveling direction control, i.e. steered.

The cleaner 130 includes a brush for sweeping foreign materials such as dust or the like on a floor, a suction module for sucking the swept foreign materials, a storage tank for storing the suctioned foreign materials, etc. The cleaner 130 operates to clean a floor while the cleaning robot 100 is moving or remains stationary by the traveler 120.

The detector 150 includes at least one sensor capable of identifying ambient environments. The detector 150 is configured to detect environments around the cleaning robot 100 which is moving or doing a clean. According to an embodiment of the disclosure, the detector 150 refers to a location recognition module capable of recognizing the location of the cleaning robot 100 based on sensed results of the sensor.

The sensor of the detector 150 includes an image sensor provided in a camera, a LiDAR sensor, a 3D sensor, a geomagnetic sensor, an infrared (IR) sensor, an ultrasonic sensor, a laser sensor, a radar sensor, a position sensitive detector (PSD), or the like location recognition sensor.

According to an embodiment, the location recognition sensor may use a radio wave to measure a distance and detect an object. The detector 150 may transmit a detection signal frontward and receive a reflected signal through the location recognition sensor, and detect ambient environments including an obstacle based on the received reflected signal. The detection signal used in the location recognition sensor may have an unrestricted frequency band, and have a spectrum in the form of energy distributed in a wide frequency band. For example, the detection signal may be embodied by an ultra-wideband (UWB) RF signal, and thus minimize interference with other signals (for global positioning system (GPS), Bluetooth, Zigbee, WLAN, etc.) of which frequency bands are relatively narrow.

The image sensor generates an image by taking or capturing the image of the surroundings of the cleaning robot 100.

There are no limits to places where the camera is installed in the main body 101, and the camera according to an embodiment is installed at a front or upper portion of the main body 101 so as to capture a forward side of the cleaning robot 100, i.e. a moving direction in which the cleaning robot 100 moves. In an embodiment, the cleaning robot 100 may include a plurality of cameras.

The camera includes a lens through which a captured image passes, and an image sensor. The image sensor, to which a complementary metal-oxide semiconductor (CMOS) detector or a charge coupled device (CCD) detector may be applied, captures the forward side of the cleaning robot 100 and generates a digital image based on captured results.

The camera may be mounted with various kinds of optical lenses to capture a surrounding image in a wider range or more precisely.

According to an embodiment, the camera employs a lens of which a view angle is wide enough to capture all surrounding regions even at a predetermined position. Further, the camera is installed to face upward and thus configured to capture the whole regions of the ceiling. The cleaning robot 100 may identify its own location based on such image data obtained by capturing the ceiling, or generate a map of the ceiling region. Further, a previously generated map may be modified based on image data, or a merged map of the whole cleaning region may be generated based on image data captured by other cleaning robots.

In an embodiment, the location recognition sensor of the detector 150 is installed on the front or top of the main body 101 to detect an obstacle located in a traveling direction of the cleaning robot 100. In an embodiment, there may be a plurality of location recognition sensors. For example, the plurality of sensors may be installed as arranged in series on the front top or bottom of the main body 101. The plurality of sensors may transmit detection signals in sequence, and sequentially receive reflection signals of the detection signals.

The cleaning robot 100 according to an embodiment of the disclosure may use the data obtained by the detector 150 to autonomous generate or modify the map.

Besides, the cleaning robot 100 may further include various elements, for example, a user interface (UI) 160 installed in the main body 101, receiving a user input, and displaying status information of the cleaning robot 100.

According to an embodiment, the UI 160 may include an input button structure such as a power button for turning on and off the cleaning robot 100, a toggle button for starting and stopping the operation of the cleaning robot 100, a returning button for returning the cleaning robot 100 to the charging apparatus 200, etc. and a display for displaying a current status of the cleaning robot 100 and a status corresponding to a user's instruction.

According to an embodiment, the UI 160 may further include a voice input receiver for receiving a voice/sound uttered by a user. The voice input receiver may be embodied by a microphone that receives an audio signal.

The charging apparatus 200 is installed at a certain stationary location within a use environment of the cleaning robot 100, and connected to an external power source. According to an embodiment, the charging apparatus 200 is installed at a predetermined location in one certain region of the individual cleaning regions.

The charging apparatus 200 basically charges the battery of the cleaning robot 100 when the cleaning robot 100 is docked thereon, and additionally performs various maintenance operations of the cleaning robot 100.

The charging apparatus 200 as shown in FIG. 3 includes a main body 201 forming an outer appearance and provided with general elements, and a charging connector 210 connectable with a charging terminal provided in the cleaning robot 100.

In addition, the charging apparatus 200 may further include various elements, for example, a power control circuit internally provided to convert external power (alternating current, AC) into charging power (direct current, DC) and supply the charging power (DC) to the battery 180 of the cleaning robot 100 through the charging connector 210.

According to an embodiment, the cleaning robot 100 may have a fixed start location for performing a clean. For example, the cleaning robot 100 may be previously set to receive a cleaning command while being docked on a charging station 200. In this case, the start location is fixed to the docking location.

According to an alternative embodiment, the cleaning robot 100 may have an unfixed, i.e. flexible start location for performing a clean. In this case, the cleaning robot 100 autonomously identifies its own location based on the data of the detector 150, and starts a cleaning operation by regarding the identified location as the start location. Here, the cleaning robot 100 may perform a preset operation, for example, a rotating operation or the like to identify the location.

Below, the internal elements of the cleaning robot 100 will be described.

FIG. 4 is a block diagram of a cleaning robot according to an embodiment.

As shown in FIG. 4, the cleaning robot 100 includes a communicator 110, a traveler 120, a cleaner 130, a detector 150, a UI 160, a storage 170, a battery 180, and a processor 190.

The traveler 120, the cleaner 130, the detector 150, and the user interface 160 are equivalent to those described above in relation to the embodiment of FIG. 3.

The communicator 110 includes a communication circuit, a communication chip or the like hardware to perform wireless communication with other cleaning robots of the collaborative cleaning system 10 or 11 through various wireless protocols. In accordance with the protocols supported in the communicator 110, the cleaning robot 100 may access the AP to thereby perform communication with other cleaning robots through a predetermined network or to thereby directly perform communication with other cleaning robots. The communicator 110 may support various wireless communication protocols such as Wi-Fi, Bluetooth, IrDA, RF, ZigBee, Wi-Fi direct, LTE, etc.

The cleaning robot 100 according to an embodiment may further communicate with a certain external apparatus, e.g. at least one of the charging station 200, the terminal apparatus 300, or the server through the communicator 110.

The storage 170 is configured to store or load data. The storage 170 includes a nonvolatile memory in which data is retained regardless of whether system power is supplied or not, and a volatile memory in which data, e.g. a control program to be processed by the processor 190 is temporarily loaded. The nonvolatile memory includes a flash memory, erasable and programmable read only memory (EPROM), a hard disk drive (HDD), a solid state drive (SSD), a read only memory (ROM), etc. The volatile memory includes a random access memory (RAM), a buffer, etc.

The storage 170 of the cleaning robot 100 according to an embodiment of the disclosure is configured to store the map of the cleaning region. Here, the stored map includes an obstacle map showing the cleaning region, and an internally stored feature map. The cleaning robot 100 uses the feature map in identifying its own current location.

The storage 170 may be configured to further store data, e.g. a control program, an application, an algorithm, etc. for the operations of the cleaning robot 100 in relation to cleaning, charging, traveling, etc. The storage 170 of the cleaning robot 100 according to an embodiment of the disclosure is configured to store an algorithm for collaborating on a clean with other cleaning robots.

The battery 180 for supplying power to operate the cleaning robot 100 is provided to be rechargeable when internal power is exhausted, so that it can be used again. The battery 180 supplies power of a preset voltage to the elements of the cleaning robot 100 in response to a control signal from the processor 190. The battery 180 has a terminal via which power from the charging connector 210 of the charging station 200 is transferred to the battery 180 while the cleaning robot 100 is being docked on the charging station 200.

According to an embodiment, the battery 140 may be provided with a sensor for sensing remaining power, and thus the processor 190 checks information about the remaining power of the battery.

The processor 190 refers to a circuit embodied by combination of a CPU, a chipset and a microcontroller, or by a system on chip (SoC). The processor 190 performs computing and directing operations for general operations to be performed by the cleaning robot 100 in accordance with a control program.

The control program may include a program(s) achieved by a basic input/output system (BIOS), a device driver, an operating system, a firmware, a platform and an application. According to an embodiment, the application may be previously installed or stored when the cleaning robot 100 is manufactured, or may be installed in the cleaning robot 100 based on application data received from the outside when required in the future. The application data may for example be downloaded from an application market and the like external server to the cleaning robot 100. Such an external server is one example of a computer program product according to the disclosure, but the present inventive concept is not limited thereto.

The processor 190 of the cleaning robot 100 according to an embodiment of the disclosure includes a navigation module configured to generate a control signal for controlling motion, i.e. movement of the cleaning robot 100, and a simultaneous localization and mapping (SLAM) module configured to identify the current location of the cleaning robot 100.

The cleaning robot 100 moves, i.e. travels in the cleaning zone based on the control signal generated by the navigation module, and thus the obstacle map is generated.

The SLAM module is provided to support a localization function for identifying the current location of the cleaning robot 100 based on the data obtained through the detector 150, and a re-localization function for identifying the current location again based on the information about the feature map. The feature map may be generated by the operations of the SLAM module.

The processor 190 of the cleaning robot 100 according to an embodiment of the disclosure controls the traveler 120 and the cleaner 130 to perform the collaborative clean in a predetermined cleaning region, while communicating with other cleaning robots through the communicator 110.

Here, the processor 190 may control the plurality of cleaning robots 100, 101, . . . , 102 to be grouped, and control the groups of the cleaning robots 100, 101, . . . , 102 to be assigned with the individual cleaning regions.

According to an embodiment, the individual cleaning regions may be automatically divided or assigned based on the location information, the map, etc. of the cleaning robots 100, 101, . . . , 102 grouped by the processor 190, or set by a user input made through the UI 160. Here, the individual cleaning regions may be fixed to predetermined locations of the cleaning robots 100, 101, . . . , 102, e.g. the location of the charging station 200, or may be identified based on detection results of the detector 150 with regard to the flexible locations.

According to an alternative embodiment, the individual cleaning regions may be set by the terminal apparatus 300, the server, etc. and respectively received in the corresponding cleaning robots 100, 101, . . . , 102 through the communicator 110. A user may use the map displayed on the terminal apparatus 300, or input a predetermined setting value through the displayed UI (hereinafter, also referred to as a graphic user interface (GUI)), thereby setting the cleaning robots 100, 101, . . . , 102 to be assigned with the individual cleaning regions.

As described above, the processor 190 of a predetermined cleaning robot 100 according to an embodiment of the disclosure identifies the individual cleaning regions corresponding to the matching moving apparatus 100 for cleaning among the plurality of individual cleaning regions assigned to the matching cleaning robot 100 and at least one different cleaning robots 101 and 102 according to their current locations with respect to the whole cleaning regions based on the information received through the communicator 110, and controls the traveler 120 and the cleaner 130 to perform a clean while traveling in the identified individual cleaning regions.

Figure 5:
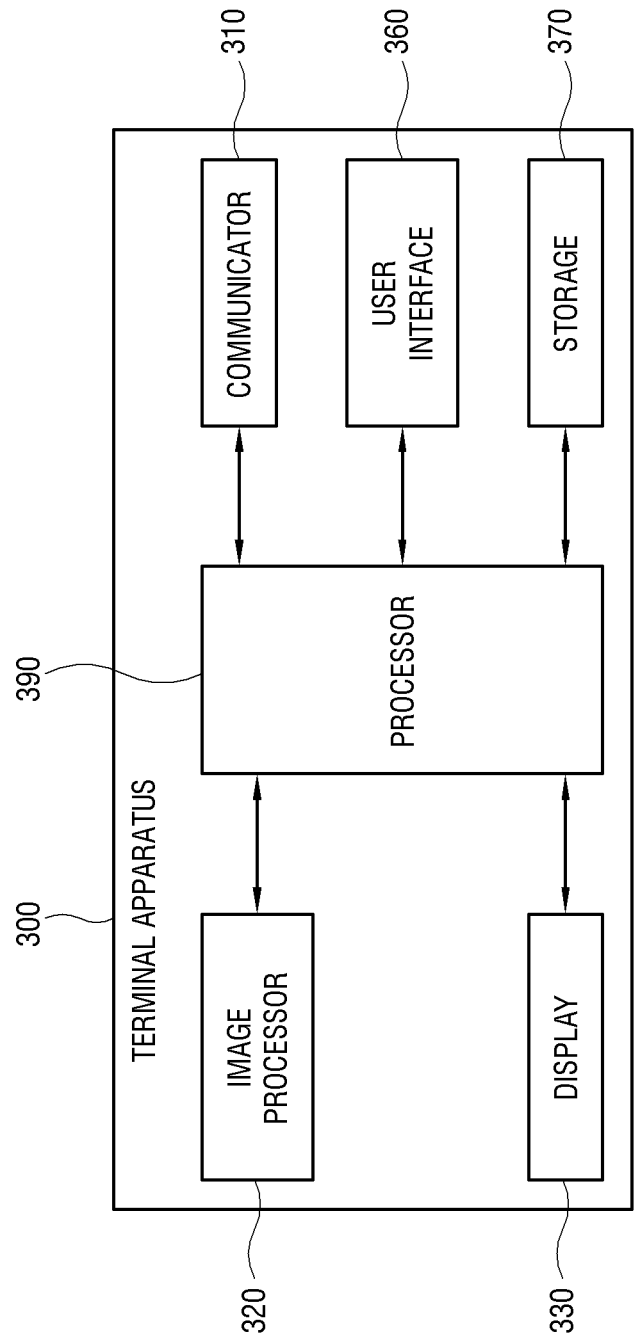
FIG. 5 is a block diagram of a terminal apparatus according to an embodiment of the disclosure.

FIG. 5 is a block diagram of a terminal apparatus according to an embodiment of the disclosure.

An terminal apparatus 300 is wirelessly connected to other apparatuses such as the cleaning robots 100, 101, . . . , 102 and transmits/receives the control signal. According to an embodiment, the terminal apparatus 300 is defined as an apparatus that has a touch screen and transmits/receives data through a communicator 310. According to an alternative embodiment, the terminal apparatus 300 is defined as an apparatus that receives a user input through an input unit such as a mouse, a keyboard, a remote controller, etc., and performs network communication through the communicator 310.

The terminal apparatus 300, as shown in FIG. 5, includes the communicator 310, an image processor 320, a display 330, a UI 360, a storage 370, and a processor 390.

The communicator 310 of the terminal apparatus 300 is provided corresponding to communication standards for a communicator 110 of the cleaning robot 100, and performs communication with the plurality of cleaning robots 100, 101, . . . , 102 directly or through a predetermined network formed by the AP.

According to an embodiment, the communicator 310 further includes a mobile communicator, and the mobile communicator may connect with an external apparatus through one or at least two antennas under control of the processor 390. The mobile communicator transmits and receives a wireless signal for a voice call, a video call, a short message service (SMS), a multimedia messaging service (MMS), and data communication to and from a cellular phone, a smart phone, a tablet, or other terminal apparatuses (or portable apparatuses) which have a phone number for connection with the terminal apparatus 300.

The image processor 320 may include a broadcast communication unit, an audio play unit or a video play unit. The broadcast communication unit may receive a broadcast signal from an external broadcasting station through a broadcast communication antenna under control of the processor 390. Further, the image processor 320 may process the received broadcast signal and broadcast appended information to be reproduced in the display 330 and/or a loudspeaker through a video codec unit and/or an audio codec unit.

The display 330 displays an image based on an image signal processed by the image processor 320. There are no limits to the types of the display 330. For example, the display 330 may be embodied by various display types such as liquid crystal, plasma, a light-emitting diode, an organic light-emitting diode, a surface-conduction electron-emitter, a carbon nano-tube, nano-crystal, etc. The display 330 may further include a driver and the like additional components according to its types.

The display 330 may display objects 100, 101, . . . , 102, for example, a menu, a text, an image, a moving image, a figure, an icon, and a shortcut icon) including menu items of the terminal apparatus 300, as a UI. According to an embodiment, the object is displayed on an initial screen of the terminal apparatus 300, and includes a cleaning robot icon (see 301 in FIG. 2) corresponding to an application for controlling the cleaning robot.

A user may make a user input by selecting the object displayed on the display 330 with a user's body such as a finger or a stylus, a pointing device, a mouse, or the like input device.

In the terminal apparatus 300 according to the embodiment of FIG. 5, the UI 360 may be defined to include at least one among a physical button, a keypad displayed on the touch screen, a separate input device (e.g. a stylus, a pointing device, etc.) allowing a user's touch input, an input device (e.g. a mouse, a keyboard, etc.) connectable to the terminal apparatus, and a microphone capable of receiving a user's voice/sound.

The UI 360 may receive a touch of a user's body (e.g. a finger) on the touch screen. The UI 360 transmits various preset control commands or information to the processor 390 in response to a user's input including a touch input. According to an embodiment, the UI 360 of the terminal apparatus 300 may receive a user's interaction with content displayed on the display 330, i.e. receive a gesture input.

The UI 360 may include at least one of one or at least two buttons, the microphone, the keypad or the input device. In the terminal apparatus 300 according to an embodiment, the button includes not only the physical button but also a touch button provided on the touch screen, and the touch button may be displayed as a text or icon on the display 330. The keypad includes at least one of a physical keypad formed on the front of the terminal apparatus 300, a virtual keypad displayed on the display 330, or an external keypad connected by a wire or wirelessly (for example, a keyboard dock).

According to an embodiment, the UI 360 may set the individual cleaning regions based on a map or UI displayed on the display 330, and information about such set individual cleaning regions is transmitted to the cleaning robot.

The storage 370 is configured to store various pieces of data about the terminal apparatus 300. The storage 370 may be embodied by a nonvolatile memory (e.g. a writable ROM) which retains data even though the terminal apparatus 300 is powered off, and allows writing to reflect changes. In other words, the storage 370 may be embodied by one of a flash memory, an EPROM or an electrically erasable and programmable read only memory (EEPROM). The storage 370 may further include a volatile memory such as a dynamic random access memory (DRAM) or a static random access memory (SRAM) in which reading or writing speed of the terminal apparatus is higher than that of the nonvolatile memory.

The data stored in the storage 370 may for example include not only an operating system for driving the terminal apparatus 300 but also various applications, image data, appended data, etc. executable under this operating system. The storage 370 may be configured to store a control program for controlling the terminal apparatus 300, information about a UI provided by a manufacturer or received from a server and the like outside, images for providing the UI, user information, or relevant data.

The processor 390 performs control for operating general components of the terminal apparatus 300. The processor 390 refers to at least one processor for performing such control operation, and includes one of a CPU, an application processor (AP), or a microcomputer (MICOM). The processor 390 loads at least a part of the control program from the nonvolatile memory, i.e. the ROM, in which the control program (or the instruction) is installed, to the volatile memory, i.e. the RAM, and executes the control program.

The processor may include a single-core processor, a dual-core processor, a triple-core processor, a quad-core processor, and the like multiple-core processor. The processor may include a plurality of processors, for example, a main processor and a sub processor that operates in a sleep mode, e.g. when the display apparatus receives only standby power and does not fully operates. Further, the processor, the ROM, and the RAM are connected to one another through an internal bus.

According to an embodiment of the disclosure, when the terminal apparatus 300 is embodied by a desktop or laptop computer, the processor 390 may further include a graphic processing unit (GPU, not shown) for graphic processing.

Further, according to an alternative embodiment, when the terminal apparatus 300 is embodied by a mobile device such as a smartphone or a smart pad, or by a smart TV, the processor 390 may include the GPU. For example, the processor 390 may be embodied in the form of a SoC where the core and the GPU are combined.

The control program may include a program(s) achieved by at least one of a BIOS, a device driver, an operating system, a firmware, a platform and an application. According to an embodiment, the application may be previously installed or stored when the terminal apparatus 300 is manufactured, or may be installed in the terminal apparatus 300 based on application program data received from the outside when required in the future. The application data may for example be downloaded from an application market and the like external server to the terminal apparatus 300. Such an external server is one example of a computer program product according to the disclosure, but the present inventive concept is not limited thereto.

Below, it will be described that the terminal apparatus 300 is used to set the individual cleaning regions.

Figure 6:
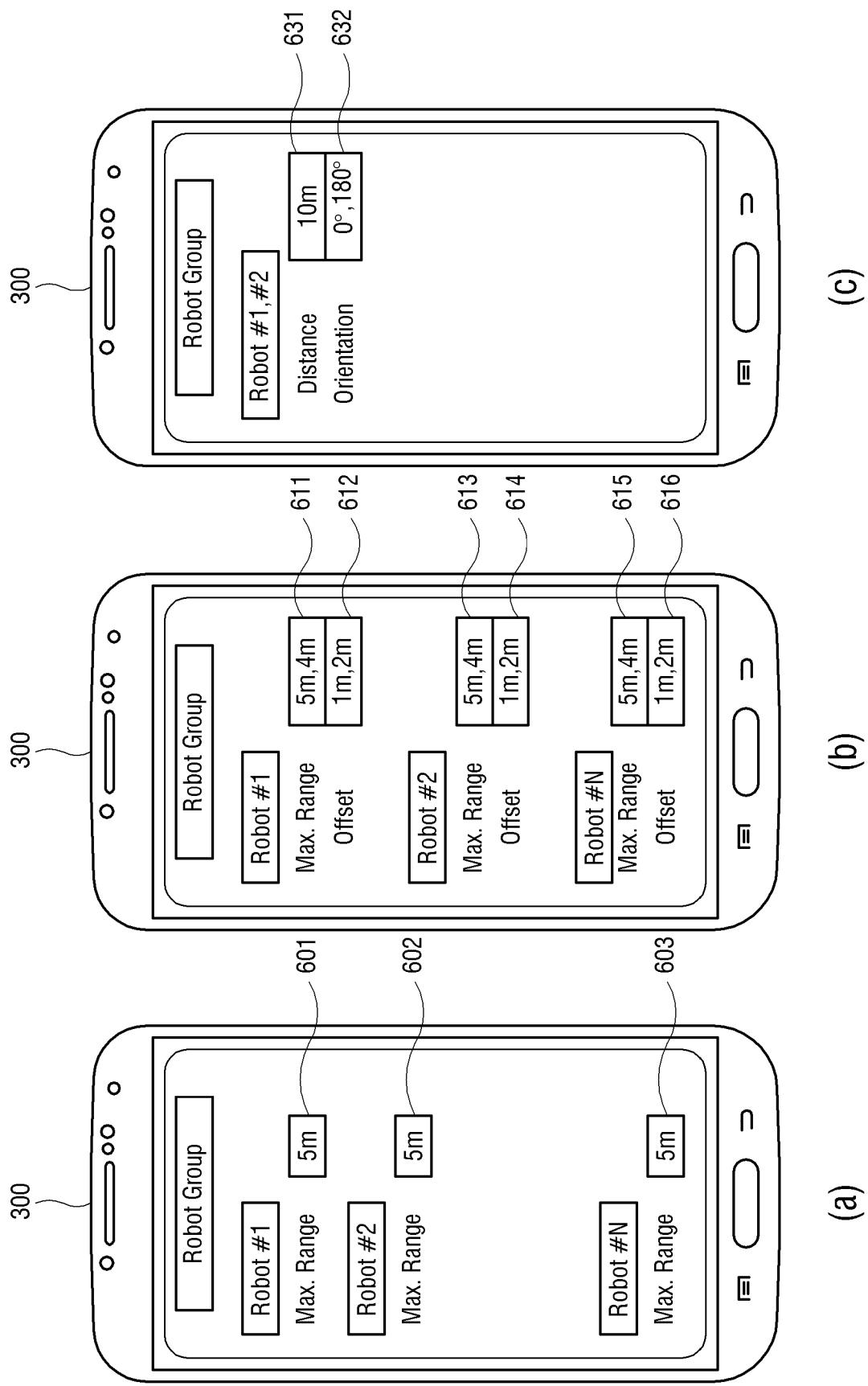
FIG. 6 illustrates screens for setting individual cleaning regions of cleaning robots according to an embodiment of the disclosure.

FIG. 6 illustrates screens for setting individual cleaning regions of cleaning robots according to an embodiment of the disclosure, which includes a UI for setting the individual cleaning regions without using the map of the cleaning space.

For example, as shown in (a) of FIG. 6, the display 330 of the terminal apparatus 300 displays a UI with a plurality of items 601, 602 and 603 by which maximum ranges Max. Range are input as setting values to set the individual cleaning regions for a plurality of grouped cleaning robots 100, 101, . . . , 102, for example, a first robot Robot #1, a second robot Robot #2 and an Nth robot Robot #N. Here, the maximum range refers to a distance as a radius with respect to the location of each of the cleaning robots 100, 101, . . . , 102. A user inputs a setting value for a distance corresponding to the maximum range of each individual cleaning region, and thus the processor 390 identifies the individual cleaning regions of the first robot, the second robot, and the Nth robot.

For another example, as shown in (b) of FIG. 6, the display 330 of the terminal apparatus 300 displays a UI with a plurality of items 611, 612, 613, 614, 615 and 616 by which a maximum range and an offset value are input as setting values for setting the individual cleaning regions for the first robot, the second robot, and the Nth robot which are grouped. Here, the maximum range refers to a distance as a radius with respect to the location of each of the cleaning robots 100, 101, . . . , 102, and the offset value refers to a deviation applicable to the distance. The processor 390 sets the individual cleaning regions of which the radii are based on the distances corresponding to the maximum ranges input for the first robot, the second robot, and the Nth robot, and adjust the ranges of the individual cleaning regions based on the input offset values.

For still another example, as shown in (C) of FIG. 6, the display 330 of the terminal apparatus 300 may display a UI with a plurality of items 631 and 632 by which a distance and an orientation between the cleaning robots are input as setting values for setting the individual cleaning regions for the first robot, the second robot, and the Nth robot which are grouped. The processor 390 sets the individual cleaning regions of which the radii are based on predetermined distances for the first robot and the second robot in response to the input distance and orientation.

Figure 7:
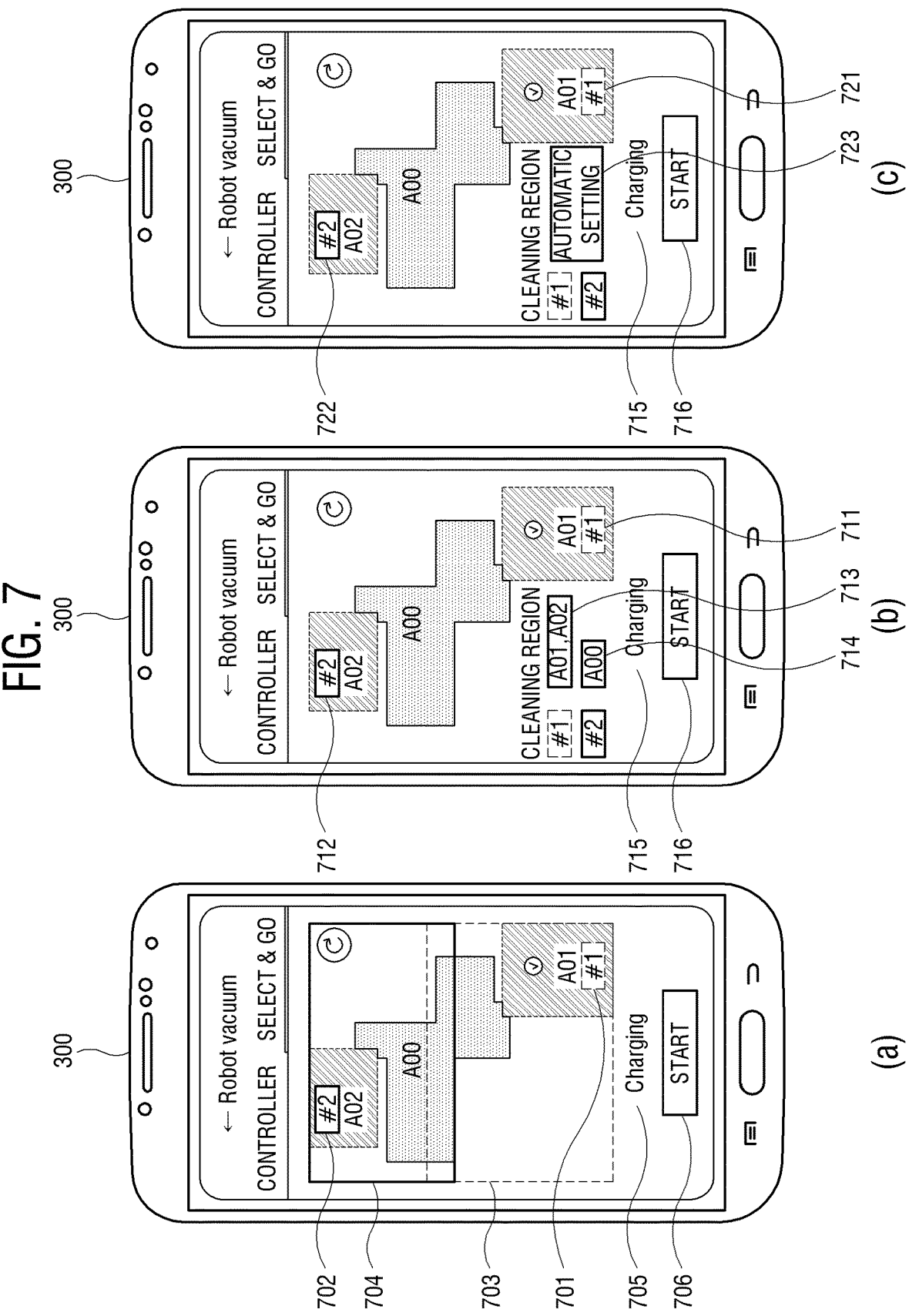
FIG. 7 illustrates screens for setting individual cleaning regions of cleaning robots according to another embodiment of the disclosure.

FIG. 7 illustrates screens for setting individual cleaning regions of cleaning robots according to another embodiment of the disclosure, which includes a UI for setting the individual cleaning regions by using the map of the cleaning space.

According to the disclosure, for example, the map of the whole cleaning region includes individual cleaning regions A00, A02 and A03 previously divided as shown in FIG. 7. However, the disclosure is not limited to this example, and the whole cleaning region may be artificially divided by a user input or the like to set the individual cleaning regions.

For example, as shown in (a) of FIG. 7, the display 330 of the terminal apparatus 300 displays a map of the whole cleaning regions divided into A00, A01 and A02. Here, the displayed map of the cleaning region may be previously generated based on at least one cleaning robot, and received in the terminal apparatus 300 from the corresponding cleaning robot, the server or the like through the communicator 310.

Referring to (a) of FIG. 7, a first cleaning robot #1 701 and a second cleaning robot #2 702 are respectively displayed at their stationary locations as docked to the charging stations 200 within the map, and a message 705 saying that the robot is being charged may be additionally displayed.

A user may set and adjust the individual cleaning regions by dragging regions 703 and 704 for the first cleaning robot #1 and the second cleaning robot #2. With this, referring to (a) of FIG. 7, the processor 390 sets the individual cleaning region for the first cleaning robot #1 to include partial regions A01 and A00, and sets the individual cleaning region for the second cleaning robot #2 to include partial regions of A02 and A00. When the individual cleaning regions are completely set and a user selects a start button 706, the processor 390 transmits a command, which is issued to the corresponding cleaning robots #1 and #2 to clean their matching individual cleaning regions, through the communicator 110.

For another example, as shown in (b) of FIG. 7, the display 330 of the terminal apparatus 300 displays a map of the cleaning regions divided into A00, A01 and A02, in which a first cleaning robot #1 711 and a second cleaning robot #2 712 are respectively displayed at their stationary locations as docked to the charging stations 200 within the map, and a message 715 saying that the robot is being charged may be additionally displayed.

The screen shown in (b) of FIG. 7 further displays a UI with input boxes 713 and 714 by which an input is allowed with regard to the individual cleaning regions for the first cleaning robot #1 and the second cleaning robot #2. A user may set and adjust the individual cleaning regions by inputting region information to the input boxes 713 and 714 corresponding to the cleaning robots #1 and #2. With this, referring to (b) of FIG. 7(*b*), the processor 390 sets the individual cleaning region for the first cleaning robot #1 to include A01 and A00, and sets the individual cleaning region for the second cleaning robot #2 to include partial regions of A00. When the individual cleaning regions are completely set and a user selects a start button 716, the processor 390 transmits a command, which is issued to the corresponding cleaning robots #1 and #2 to clean their matching individual cleaning regions, through the communicator 110.

For still another example, as shown in (C) of FIG. 7, the display 330 of the terminal apparatus 300 displays a map of the cleaning region divided into A00, A01 and A02, in which the first cleaning robot #1 721 and the second cleaning robot #2 722 are respectively displayed at their stationary locations as docked to the charging stations 200 within the map, and a message 725 saying that the robot is being charged may be additionally displayed.

Here, as shown in (C) of FIG. 7, automatic setting 723 may be selected with regard to the individual cleaning regions for the first cleaning robot #1 and the second cleaning robot #2, and thus the processor 390 automatically divides the cleaning region and sets the individual cleaning regions based on the map of the cleaning region, the locations of the cleaning robots #1 and #2, etc. When the individual cleaning regions are completely set and a user selects a start button 726, the processor 390 transmits a command, which is issued to the corresponding cleaning robots #1 and #2 to clean their matching individual cleaning regions, through the communicator 110. A specific embodiment of automatically assigning the individual cleaning regions will be described later in more detail with reference to FIG. 10.

Figure 8:
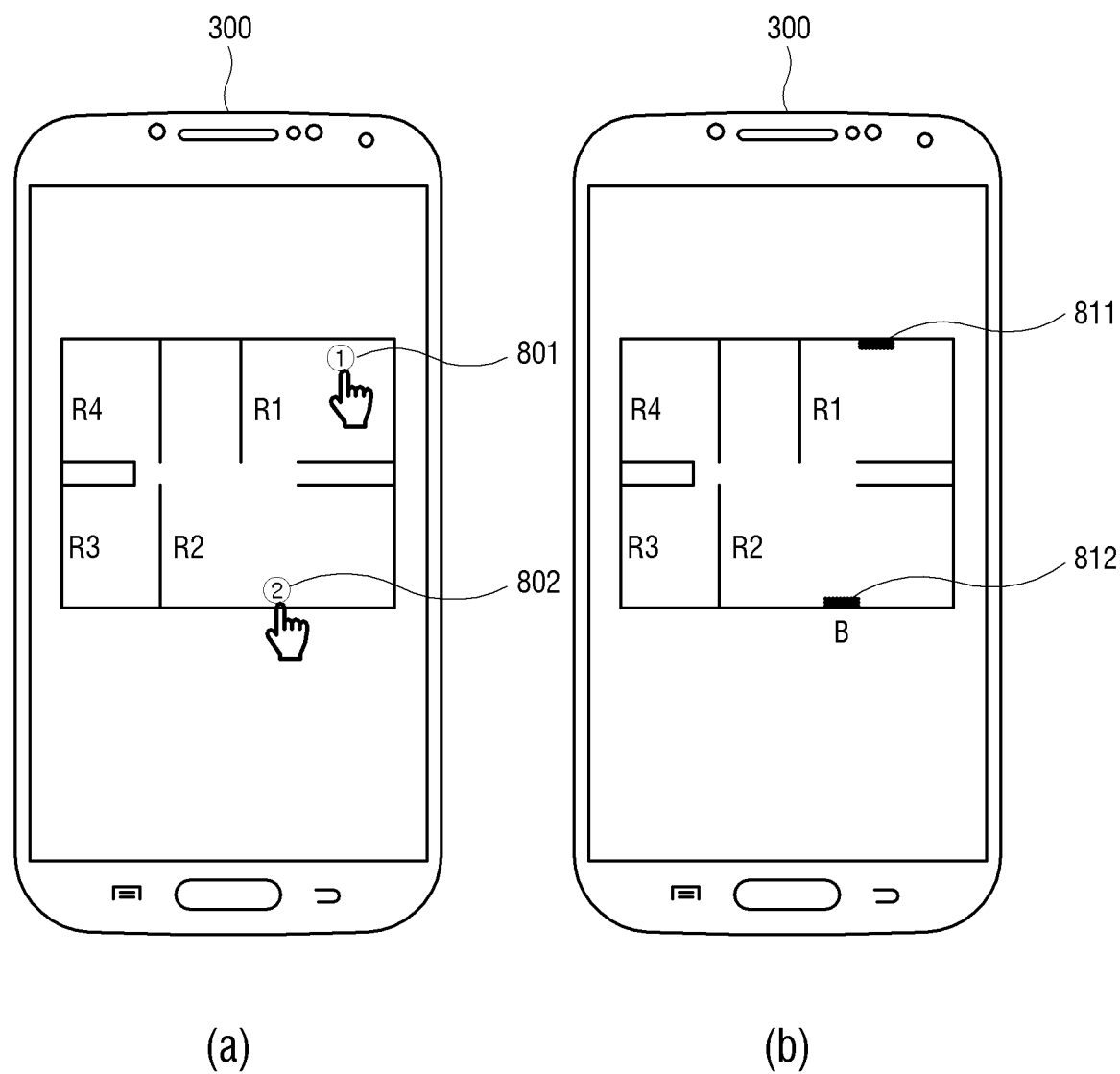
FIGS. 8 and 9 illustrate screens for setting individual cleaning regions of cleaning robots according to still another embodiment of the disclosure.
Figure 9:
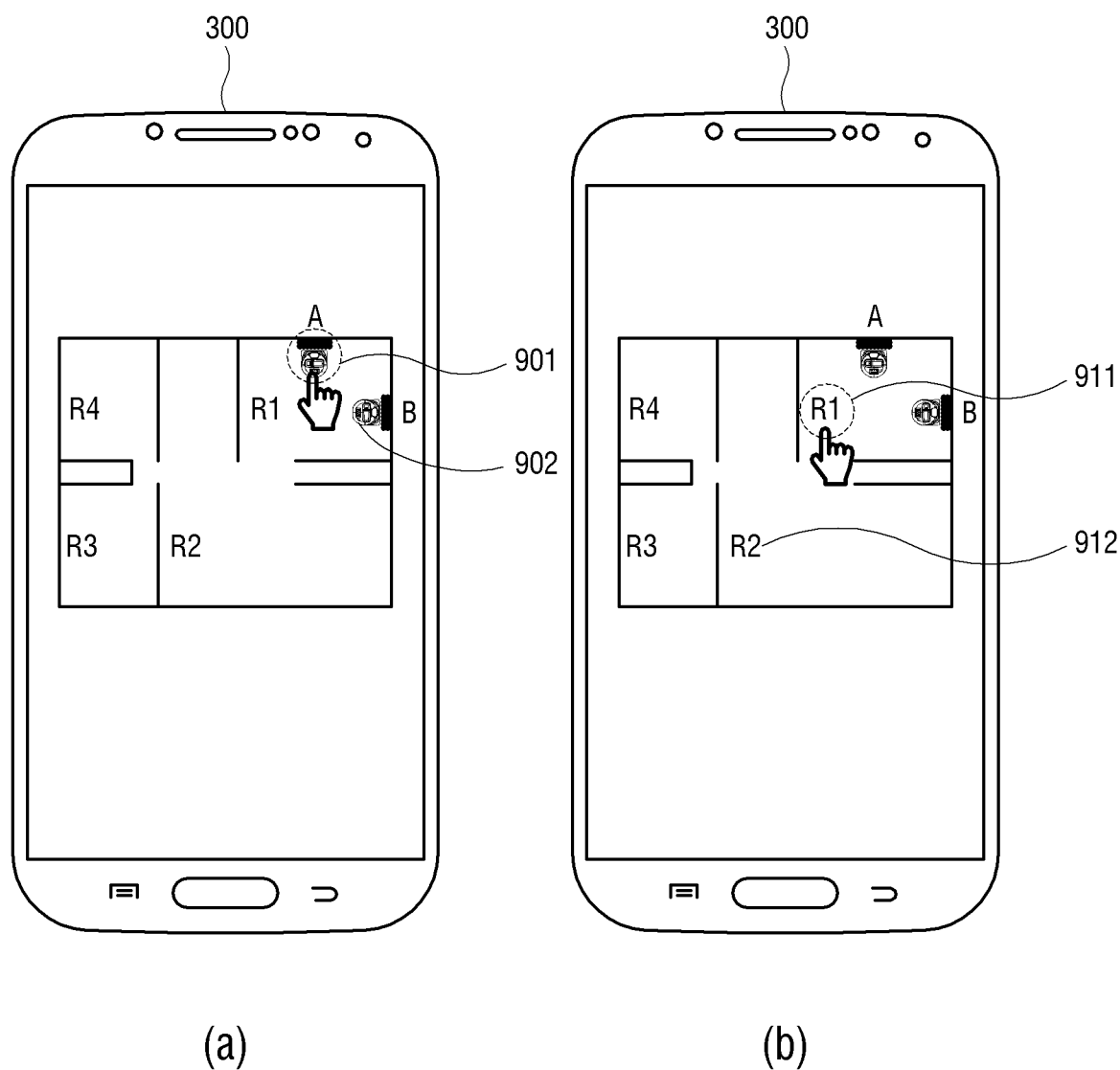

FIGS. 8 and 9 illustrate screens for setting individual cleaning regions of cleaning robots according to still another embodiment of the disclosure, which includes a UI for setting the individual cleaning regions by using the map of the cleaning space.

For example, as shown in FIGS. 8 and 9, the display 330 of the terminal apparatus 300 displays a map of a cleaning region divided into R1, R2, R3 and R4.

When a cleaning robot A and a cleaning robot B are present within the cleaning region, and a user designates start locations 801 and 802 for the cleaning robots A and B as shown in (a) of FIG. 8, start locations 811 and 812 for the cleaning robots A and B are updated and displayed as shown in (b) of FIG. 8. Here, the start locations 811 and 812 designated for the cleaning robots A and B may also be the locations of the charging stations 200.

A user may select a cleaning robot A 901 as shown in (a) of FIG. 9 and assign the selected cleaning robot A with the individual cleaning region R1 911 as shown in (b) of FIG. 9. In the same manner, a user may select a cleaning robot B 902 and assign the selected cleaning robot A with the individual cleaning region R2 912. Likewise, a user may select regions R3 and R4 to be included in the individual cleaning regions for the cleaning robot A or B.

As above, it was described with reference to FIGS. 6 to 9 that a user of the terminal apparatus 300 sets the individual cleaning regions for the plurality of cleaning robots through the UI displayed on the screen. However, the disclosure is not limited to the foregoing embodiments, and the individual cleaning regions for the plurality of cleaning robots may be set by using the map, without using the map, automatically, based on a user input, and the like various methods.

Figure 10:
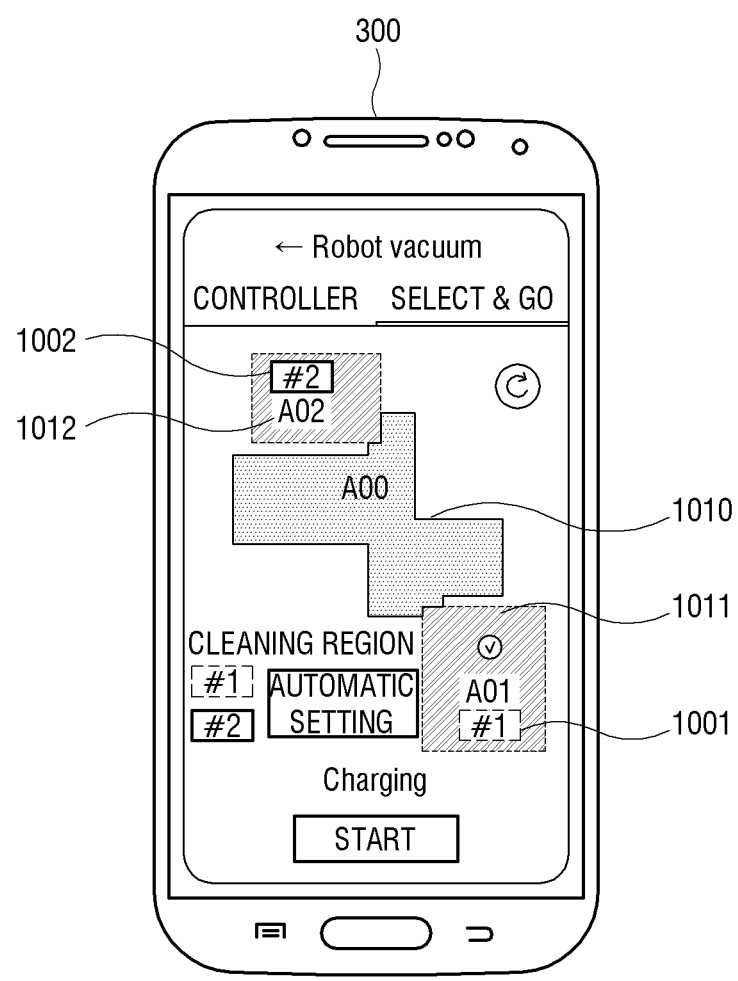
FIG. 10 illustrates automatic settings for individual cleaning regions according to an embodiment of the disclosure.

FIG. 10 illustrates automatic settings for individual cleaning regions according to an embodiment of the disclosure.

The automatic settings for the individual cleaning regions, which will be described with reference to FIG. 10, may be performed by at least one of the processor 190 of a predetermined cleaning robot 100 or the processor 390 of the terminal apparatus 300.

As shown in FIG. 10, when the whole cleaning region includes individual cleaning regions A00 1010, A01 1011, and A02 1012, the areas of the whole cleaning region and the individual cleaning regions may be as follows.

The area of the whole cleaning region: 100 $m^2$

The areas of the individual cleaning regions: A00 50 $m^2$, A01 30 $m^2$, A02 20 $m^2$ Here, when two cleaning robots are used to carry out a collaborative clean, the area of the whole cleaning region is divided by the number of cleaning robots, the individual cleaning regions are assigned as follows based on the number of cases, and comparison in size between the assigned regions is made.

A00: 50, A01+A02: 50, and a difference is 0

A00+A01: 80, A02: 20, and a difference is 60

A00+A02: 70, A012: 30, and a difference is 40

Then, the case of the minimum difference between the assigned regions, i.e. 'A00: 50, A01+A02: 50' is selected, and the individual cleaning regions for the plurality of cleaning robots are identified in such a manner that a certain cleaning robot 1001 is assigned to 'A00' and another cleaning robot 1002 is assigned to 'A01+A02'.

FIG. 10 shows an example that the whole cleaning region includes previously divided individual cleaning regions like A00, A01 and A02, but the automatic region assignment according to the disclosure may also be carried out even when there are no previously divided regions.

Specifically, the processor 190 or 390 may calculate the area of the whole cleaning region, divide the whole cleaning region into the individual cleaning regions for the cleaning robots to have the same average area as many ad the number of cleaning robots with respect to up and down/left and right reference lines, and identify the divisional regions as the individual cleaning regions.

Further, the foregoing two methods may be combined. For example, in a case of rooms, the rooms are identified as previously divided individual cleaning regions, and the cleaning robot is assigned to each room. Further, a living room is divided into regions to have the same area as many as the number of cleaning robots, and the cleaning robot is assigned to each divided region.

Figure 12:
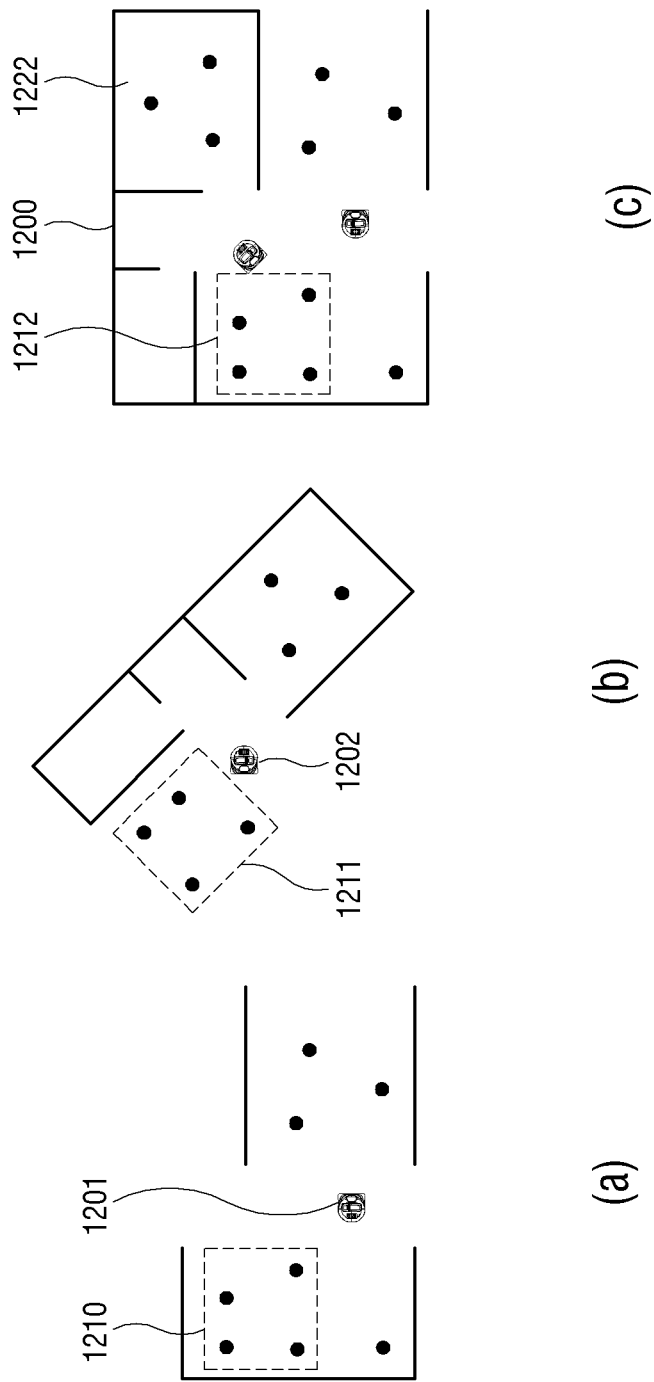
FIG. 12 illustrates a process of merging maps according to an embodiment of the disclosure.

For example, when it is assumed that A00 1010 is a living room and A01 1011 and A02 1012 are rooms in FIG. 12, A01 1011 is assigned with a first cleaning robot 1001, A02 1012 is assigned with a second cleaning robot 1001, and A00 1010 is divided into regions to have the same area of 25 $m^2$ and be respectively assigned with and cleaned by the first and second cleaning robots.

Here, the processor 190 and 390 may consider a distance between the cleaning robot and the individual cleaning regions, and control the cleaning robots to be assigned to the individual cleaning regions to travel the shortest distance.

Below, it will be described that the plurality of cleaning robots 100, 101, . . . , 102 in the collaborative cleaning system 10 or 11 performs a collaborative clean according to various embodiments of the disclosure.

The embodiments of carrying out the collaborative clean according to the disclosure are equivalent in that the plurality of cleaning robots are grouped, the grouped cleaning robots are respectively assigned with the individual cleaning regions, and the cleaning robots clean their assigned individual cleaning regions, but different as shown in the following table 1 in assigning the individual cleaning regions or performing a clean in each individual cleaning regions.

TABLE 1

|  | characterized in that | map is | start location is | Real time map is | Priority is |
|---|---|---|---|---|---|
| first embodiment | collaborative clean is performed by setting individual cleaning regions with respect to fixed locations of the cleaning robots | not used | fixed | not shared | not given |
| second embodiment | collaborative clean is performed by setting individual cleaning regions based on map where locations of cleaning robots are fixed | used | fixed | not shared | not given/ given |
| third embodiment | collaborative clean is performed by setting individual cleaning regions based on map where locations of cleaning robots are flexible | used | flexible | not shared | not given/ given |
| fourth embodiment | collaborative clean is performed by additionally setting individual cleaning regions based on map shared in real time between cleaning robots | not used | flexible | shared | not given |
| fifth embodiment | collaborative clean is performed by setting individual cleaning regions based on priority of cleaning robots | used | fixed/ flexible | not shared | given |

First Embodiment

In the first embodiment, the locations of the plurality of cleaning robots are fixed at their charging stations, and the individual cleaning regions for the cleaning robots are set based on the fixed locations.

In the first embodiment, the individual cleaning regions for the cleaning robots are set without using the map. For example, as described with reference to FIG. 6, a console, i.e. the terminal apparatus 300 may be used in the setting. Here, as shown in (a) of FIG. 6, a user may input a setting value for the maximum range, i.e. a distance as a radius with respect to a fixed location of a redetermined cleaning robot, and thus the individual cleaning regions for the corresponding cleaning robots are identified. Further, as shown in (c) of FIG. 6, a user may input setting values for a distance and an orientation between the cleaning robots, and thus the individual cleaning regions for the corresponding cleaning robots are identified. Here, the identified cleaning region may have not only a circular shape but also a rectangular shape or a certain shape corresponding to a real cleaning space.

For another example, the individual cleaning regions may be set through the UI 160 of the cleaning robot 100 without using the terminal apparatus 300. Here, the setting of the individual cleaning regions based on the UI 160 includes setting based on voice recognition.

For still another example, the individual cleaning regions may be automatically set in the respective cleaning robots without a user input. To this end, the cleaning robot may identify a relative location, i.e. a distance, an orientation, etc. of another cleaning robot based on data obtained through the detector 150, and thus the traveler 120 may be controlled to perform initial rotation or the like previously set operation. The cleaning robot sets the individual cleaning regions of the respective cleaning robots based on the relative locations identified as described above.

The processor 190 of each cleaning robot regards such a set individual cleaning region as a kind of virtual wall, and controls the cleaning robot not to cross the virtual wall while carrying out a clean. Further, the cleaning robots are controlled to perform a clean while communicating with one another through the network. In this process, a start and a finish of a clean, and status information related to a battery or the like may be shared among the cleaning robots.

In the foregoing first embodiment, various additional settings for cleaning are possible with regard to the cleaning robots or the individual cleaning regions.

First, when the cleaning robot is automatically assigned with the individual cleaning region based on its location relative to another cleaning robot, the relative location may be taken into account to thereby additionally set cleaning directions for the plurality of cleaning robots. In other words, when two cleaning robots are relatively located within a range shorter than a predetermined distance shorter, the two cleaning robots may perform a clean while travelling in opposite directions. For example, the first cleaning robot is controlled to perform a clean while traveling by a left-handed technique, and the second cleaning robot is controlled to perform a clean while traveling by a right-handed technique.

Further, to schedule the cleaning robots, the plurality of cleaning robots, i.e. the first cleaning robot and the second cleaning robot may be set to perform cleans leaving a time gap therebetween. For example, a dry clean in a first individual cleaning region and a wet clean in a second individual cleaning region are scheduled for a first cleaning time, and the wet clean in the first individual cleaning region and the dry clean in the second individual cleaning region are scheduled for a second cleaning time. In this case, for the first cleaning time, a dry cleaner, i.e. the first cleaning robot is assigned to the first individual cleaning region, and a wet cleaner, i.e. the second cleaning robot is assigned to the second individual cleaning region. Further, for the second cleaning time, the wet cleaner, i.e. the second cleaning robot is assigned to the first individual cleaning region, and the dry cleaner, i.e. the first cleaning robot is assigned to the second individual cleaning region.

Further, when it is detected that a battery of a certain cleaning robot is charging or used up, the clean may be controlled to be performed after the charging is completed.

Further, a traveling motion may be set for each individual cleaning robot. For example, the first cleaning robot may be controlled to perform cleaning while traveling in a zigzag pattern, and the second cleaning robot may be controlled to perform cleaning while traveling in a spiral pattern.

Second Embodiment

In the second embodiment, the locations of the plurality of cleaning robots, i.e. the start locations for cleaning are respectively fixed to the locations of their charging stations, and the individual cleaning regions for the cleaning robots are set based on the fixed locations.

In the second embodiment, the individual cleaning regions for the cleaning robots are set based on the map showing the whole cleaning region. For example, as described with reference to FIG. 7, the setting may be achieved based on a user gesture or the like with respect to the map displayed on the display 330 of the console, i.e. the terminal apparatus 300. Here, the displayed map of the cleaning region is generated by at least one cleaning robot, and transmitted to the terminal apparatus 300 through the communicator 310 by way of example. Alternatively, the map of the cleaning region may be received from the server or the like reflecting actually measured locations.

While the map showing the cleaning region is generated, the start locations of the cleaning robots may be mapped on the map. To this end, the plurality of cleaning robots may be controlled to be docked on their charging stations and perform near field communication with the charging stations, thereby mapping the start locations on the charging stations. On the map, the locations of the charging stations are input as the start locations.

The map generated or input/received as above is transmitted to the terminal apparatus 300 through the network and displayed on the display 330.

As described with reference to (a) or (b) of FIG. 7, a user may set the individual cleaning regions by inputting a text corresponding to a distance as a radius with respect to a predetermined cleaning robot, drawing based on dragging, etc. Further, as described with reference to (c) of FIG. 7, the individual cleaning regions may be automatically set to perform cleaning within the shortest time by taking the start locations of the cleaning robots into account without a user input.

The processor 190 of each cleaning robot regards such a set individual cleaning region as a kind of virtual wall, and controls the cleaning robot not to cross the virtual wall while carrying out a clean. Further, the cleaning robots are controlled to perform a clean while communicating with one another through the network. In this process, a start and a finish of a clean, and status information related to a battery or the like may be shared among the cleaning robots.

In the foregoing second embodiment, various additional settings for cleaning are possible with regard to the cleaning robots or the individual cleaning regions.

First, two or more cleaning robots may be overlappingly set for a predetermined cleaning region. In this case, one cleaning robot may be given higher priority than another cleaning robot. A case where the priority is set will be described later in more detail in the following fifth embodiment.

Further, to schedule the cleaning robots, the plurality of cleaning robots, i.e. the first cleaning robot and the second cleaning robot may be set to perform cleans leaving a time gap therebetween. For example, a dry clean in a first individual cleaning region and a wet clean in a second individual cleaning region are scheduled for a first cleaning time, and the wet clean in the first individual cleaning region and the dry clean in the second individual cleaning region are scheduled for a second cleaning time. In this case, for the first cleaning time, a dry cleaner, i.e. the first cleaning robot is assigned to the first individual cleaning region, and a wet cleaner, i.e. the second cleaning robot is assigned to the second individual cleaning region. Further, for the second cleaning time, the wet cleaner, i.e. the second cleaning robot is assigned to the first individual cleaning region, and the dry cleaner, i.e. the first cleaning robot is assigned to the second individual cleaning region.

Further, when it is detected that a battery of a certain cleaning robot is charging or used up, the clean may be controlled to be performed after the charging is completed.

Further, a traveling motion may be set for each individual cleaning robot. For example, the first cleaning robot may be controlled to perform cleaning while traveling in a zigzag pattern, and the second cleaning robot may be controlled to perform cleaning while traveling in a spiral pattern.

Third Embodiment

In the third embodiment, the start locations of the plurality of cleaning robots are not fixed. The current locations of the cleaning robots are identified, and the individual cleaning regions for the cleaning robots are set based on the identified locations.

In the third embodiment, the individual cleaning regions for the cleaning robots are set based on the map showing the whole cleaning region. For example, like the second embodiment, the setting may be achieved based on a user gesture or the like with respect to the map displayed on the display 330 of the console, i.e. the terminal apparatus 300. Here, the displayed map of the cleaning region is generated by at least one cleaning robot, and transmitted to the terminal apparatus 300 through the communicator 310 by way of example. Alternatively, the map of the cleaning region may be received from the server or the like reflecting actually measured locations.

However, the locations of the cleaning robots according to the third embodiment are not fixed, and therefore the processor 190 of the cleaning robot 100 performs localization or re-localization to identify its own current location while the map is generated. With this, the current locations of the cleaning robots are mapped on the map.

Figure 11:
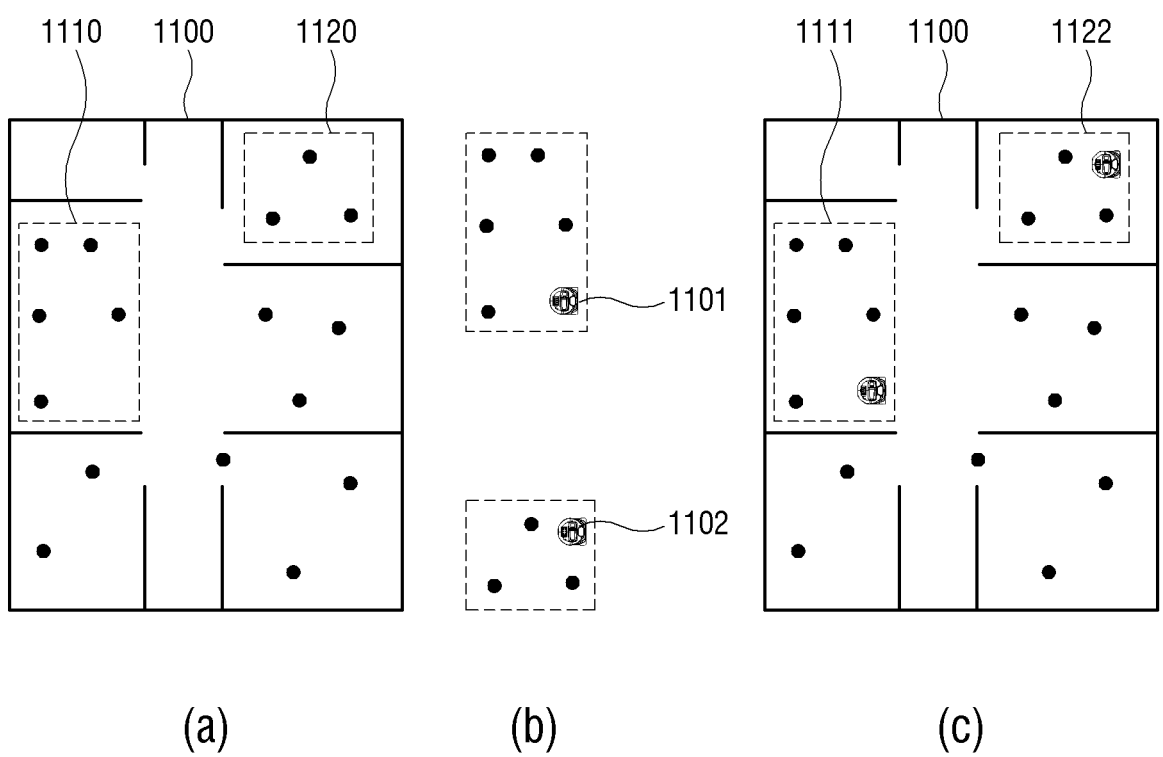
FIG. 11 illustrates a process of detecting current locations of a plurality of cleaning robots according to an embodiment of the disclosure.

FIG. 11 illustrates a process of detecting current locations of a plurality of cleaning robots according to an embodiment of the disclosure.

As shown in (a) of FIG. 11, the map of the whole cleaning region 1100 includes a ceiling patterns 1110 and 1120, and information about these patterns 1110 and 1120 may be obtained based on image data from the image sensor of the detector 150 provided in the cleaning robot 100. The pattern information around the cleaning robots 1101 and 1102 shown in (b) of FIG. 11 is compared with the pattern information included in the map, and then matching locations of the patterns 1111 and 1122 as shown in (c) of FIG. 11 are identified as the current locations of the cleaning robots 1101 and 1102.

The map generated as above and having the current mapping locations of the cleaning robots is transmitted to the terminal apparatus 300 through the network and displayed on the display 330.

As described with reference to (a) or (b) of FIG. 7, a user may set the individual cleaning regions by inputting a text corresponding to a distance as a radius with respect to the current location of the cleaning robot, drawing based on dragging, etc. Further, as described with reference to (c) of FIG. 7, the individual cleaning regions may be automatically set to perform cleaning within the shortest time by taking the current locations of the cleaning robots into account without a user input.

According to an embodiment, the map may show a location of a general cleaner in addition to the locations of the cleaning robots autonomously traveling and performing a clean. To this end, a detector or the like location recognition module is provided in the general cleaner, and it is thus possible to identify a cleaning region to be cleaned by the general cleaner. Further, a cleaning history of the general cleaner may be used in setting the individual cleaning regions for the cleaning robot. When a user uses the general cleaner to clean a predetermined cleaning region and there is a cleaning history of the cleaning robot about the cleaning region, the cleaning history may be provided to the user through the terminal apparatus 300 or the like, thereby preventing a redundant double clean.

The processor 190 of each cleaning robot regards such a set individual cleaning region as a kind of virtual wall, and controls the cleaning robot not to cross the virtual wall while carrying out a clean. Further, the cleaning robots are controlled to perform a clean while communicating with one another through the network. In this process, a start and a finish of a clean, and status information related to a battery or the like may be shared among the cleaning robots.

In the foregoing third embodiment, various additional settings for cleaning are possible with regard to the cleaning robots or the individual cleaning regions.

First, two or more cleaning robots may be overlappingly set for a predetermined cleaning region. In this case, one cleaning robot may be given higher priority than another cleaning robot. A case where the priority is set will be described later in more detail in the following fifth embodiment.

Further, to schedule the cleaning robots, the plurality of cleaning robots, i.e. the first cleaning robot and the second cleaning robot may be set to perform cleans leaving a time gap therebetween. For example, a dry clean in a first individual cleaning region and a wet clean in a second individual cleaning region are scheduled for a first cleaning time, and the wet clean in the first individual cleaning region and the dry clean in the second individual cleaning region are scheduled for a second cleaning time. In this case, for the first cleaning time, a dry cleaner, i.e. the first cleaning robot is assigned to the first individual cleaning region, and a wet cleaner, i.e. the second cleaning robot is assigned to the second individual cleaning region. Further, for the second cleaning time, the wet cleaner, i.e. the second cleaning robot is assigned to the first individual cleaning region, and the dry cleaner, i.e. the first cleaning robot is assigned to the second individual cleaning region.

Further, when it is detected that a battery of a certain cleaning robot is charging or used up, the clean may be controlled to be performed after the charging is completed.

Further, a traveling motion may be set for each individual cleaning robot. For example, the first cleaning robot may be controlled to perform cleaning while traveling in a zigzag pattern, and the second cleaning robot may be controlled to perform cleaning while traveling in a spiral pattern.

Fourth Embodiment

In the fourth embodiment, the individual cleaning regions are set based on real-time measured maps shared among the cleaning robots performing a collaborative clean, without using the map previously provided or previously generated by a certain cleaning robot.

In the fourth embodiment, the maps generated by the cleaning robots cleaning predetermined individual cleaning regions are shared in real time through their networking, and the maps are merged when a matching region is found in the maps.

FIG. 12 illustrates a process of merging maps according to an embodiment of the disclosure.

As shown in (a) and (b) of FIG. 12, a map generated by a first cleaning robot 1201 includes information about a predetermined ceiling pattern 1210, and a map generated by a second cleaning robot 1202 includes information about a predetermined ceiling pattern 1211.

At least one among the plurality of grouped cleaning robots, for example, the first cleaning robot 1201 may receive the map generated by the second cleaning robot 1202 through its communicator 110. Further, as shown in (c) of FIG. 12, the first cleaning robot 1201 identifies a matching pattern 1212 between its own map (i.e. a first map) and a received map (i.e. a second map) of another cleaning robot, and generates a merged map.

Here, the cleaning robot may be set to generate a map based on data obtained with regard to a traveled region after traveling in a region having a certain area, or may be set to generate a map based on data obtained for a predetermined period of time after traveling for the time. Further, when a predetermined signal is detected from a different cleaning robot, data obtained up to that time is transmitted to the different cleaning robot and controlled to be used in generating a map. Besides, when a trigger signal corresponding to a predetermined event is received, data obtained up to that time may be controlled to be used in generating a map.

In the fourth embodiment, the individual cleaning regions for the cleaning robots are shared through the merged map as shown in (c) of FIG. 12, and one of the grouped cleaning robots is assigned to an unoccupied individual cleaning region to which any cleaning robot is not assigned, thereby controlling the collaborative clean to be carried out. Such a merged map is applicable to both current and future collaborative cleans. Here, the assignment of the unassigned, i.e. unoccupied individual cleaning region may be based on one of automatic assignment or assignment based on user selection described in the first to third embodiments.

According to an embodiment, the region assignment in the merged map may further use information about a location of a general cleaner as well as the locations of the cleaning robots autonomously traveling and performing a clean. To this end, a detector or the like location recognition module is provided in the general cleaner, and it is thus possible to identify a cleaning region to be cleaned by the general cleaner. Further, a cleaning history of the general cleaner may be used in setting the individual cleaning regions for the cleaning robot. When a user uses the general cleaner to clean a predetermined cleaning region and there is a cleaning history of the cleaning robot about the cleaning region, the cleaning history may be provided to the user through the terminal apparatus 300 or the like, thereby preventing a redundant double clean.

The processor 190 of each cleaning robot regards such a set individual cleaning region as a kind of virtual wall, and controls the cleaning robot not to cross the virtual wall while carrying out a clean. Further, the cleaning robots are controlled to perform a clean while communicating with one another through the network. In this process, a start and a finish of a clean, and status information related to a battery or the like may be shared among the cleaning robots.

In the foregoing third embodiment, various additional settings for cleaning are possible with regard to the cleaning robots or the individual cleaning regions.

First, two or more cleaning robots may be overlappingly set for a predetermined cleaning region. In this case, one cleaning robot may be given higher priority than another cleaning robot. A case where the priority is set will be described later in more detail in the following fifth embodiment.

Further, to schedule the cleaning robots, the plurality of cleaning robots, i.e. the first cleaning robot and the second cleaning robot may be set to perform cleans leaving a time gap therebetween. For example, a dry clean in a first individual cleaning region and a wet clean in a second individual cleaning region are scheduled for a first cleaning time, and the wet clean in the first individual cleaning region and the dry clean in the second individual cleaning region are scheduled for a second cleaning time. In this case, for the first cleaning time, a dry cleaner, i.e. the first cleaning robot is assigned to the first individual cleaning region, and a wet cleaner, i.e. the second cleaning robot is assigned to the second individual cleaning region. Further, for the second cleaning time, the wet cleaner, i.e. the second cleaning robot is assigned to the first individual cleaning region, and the dry cleaner, i.e. the first cleaning robot is assigned to the second individual cleaning region.

Further, a predetermined cleaning robot may take another role other than cleaning. For example, the first cleaning robot may be controlled to perform cleaning, and the second cleaning robot may be controlled to explore a cleaning region and generate a map of the cleaning region.

Further, when it is detected that a battery of a certain cleaning robot is charging or used up, the clean may be controlled to be performed after the charging is completed.

Further, a traveling motion may be set for each individual cleaning robot. For example, the first cleaning robot may be controlled to perform cleaning while traveling in a zigzag pattern, and the second cleaning robot may be controlled to perform cleaning while traveling in a spiral pattern.

Fifth Embodiment

In the fifth embodiment, the locations of the plurality of cleaning robots may be fixed to the locations of their charging stations or may be flexible, and the cleaning robots are given priority and controlled to perform cleaning the individual cleaning regions based on priority.

FIGS. 13 to 16 illustrate a process of performing a collaborative clean by giving priority to a plurality of cleaning robots according to an embodiment of the disclosure.

Figure 13:
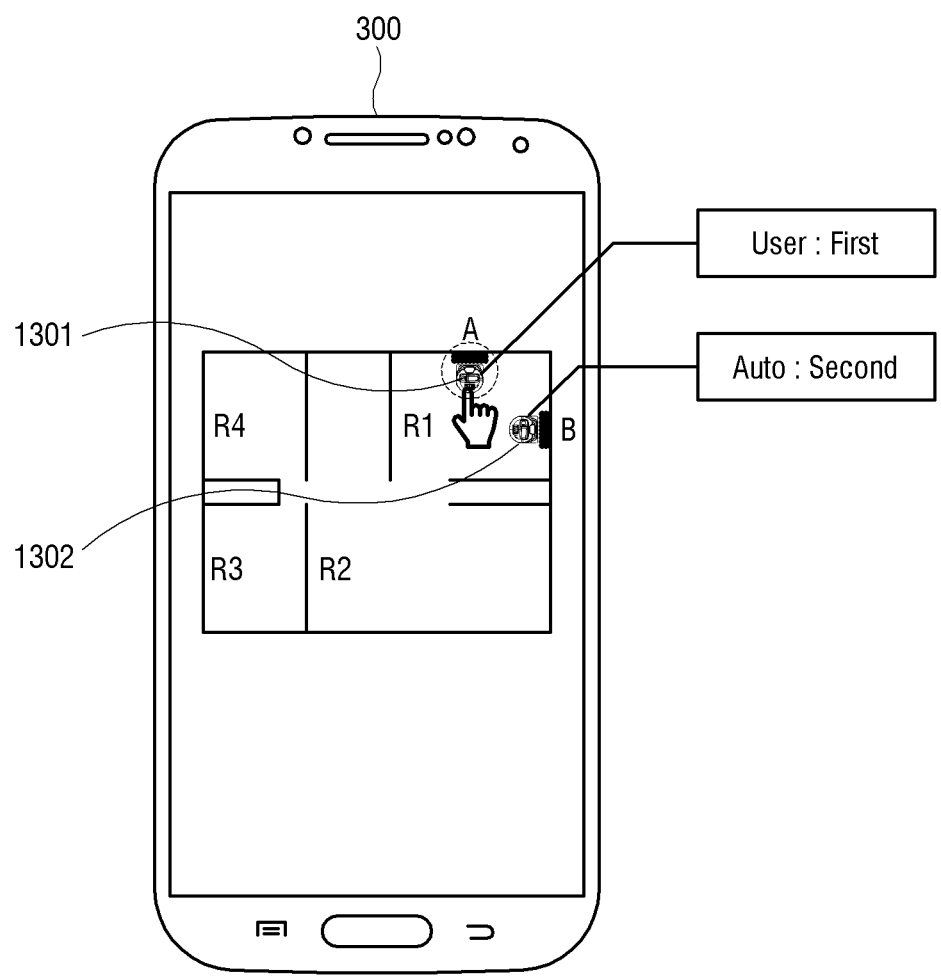
FIGS. 13 to 16 illustrate a process of performing a collaborative clean by giving priority to a plurality of cleaning robots according to an embodiment of the disclosure.

As shown in FIG. 13, a user may use the terminal apparatus 300 to select a predetermined cleaning robot, i.e. a cleaning robot A 1301 in a cleaning region to be given higher priority than another cleaning robot B 1302. FIG. 13 shows an example that priority is set through a UI in a state that cleaning robots 1301 and 1302 are docked on their charging stations, but the disclosure is not limited to this example. For example, even when the locations of the cleaning robots are flexible like the foregoing third embodiment, the plurality of cleaning robots may be given priority.

Further, according to the disclosure, three or more cleaning robots may be given priority in sequence. Further, according to the disclosure, when a user does not set the priority, the priority may be automatically given based on a predetermined reference by the terminal apparatus 300.

In the fifth embodiment, the plurality of cleaning robots performs the collaborative clean in the whole cleaning region based on the priority set as above. Here, the collaborative clean may be controlled by the processor 390 of the terminal apparatus 300 or the processor 190 of one cleaning robot 100.

For example, as described with reference to FIG. 13, a user sets the cleaning robot A between the cleaning robots A and B present in one individual cleaning room R1 to have higher priority than the cleaning robot B, and issues a command to perform the collaborative clean.

Figure 14:
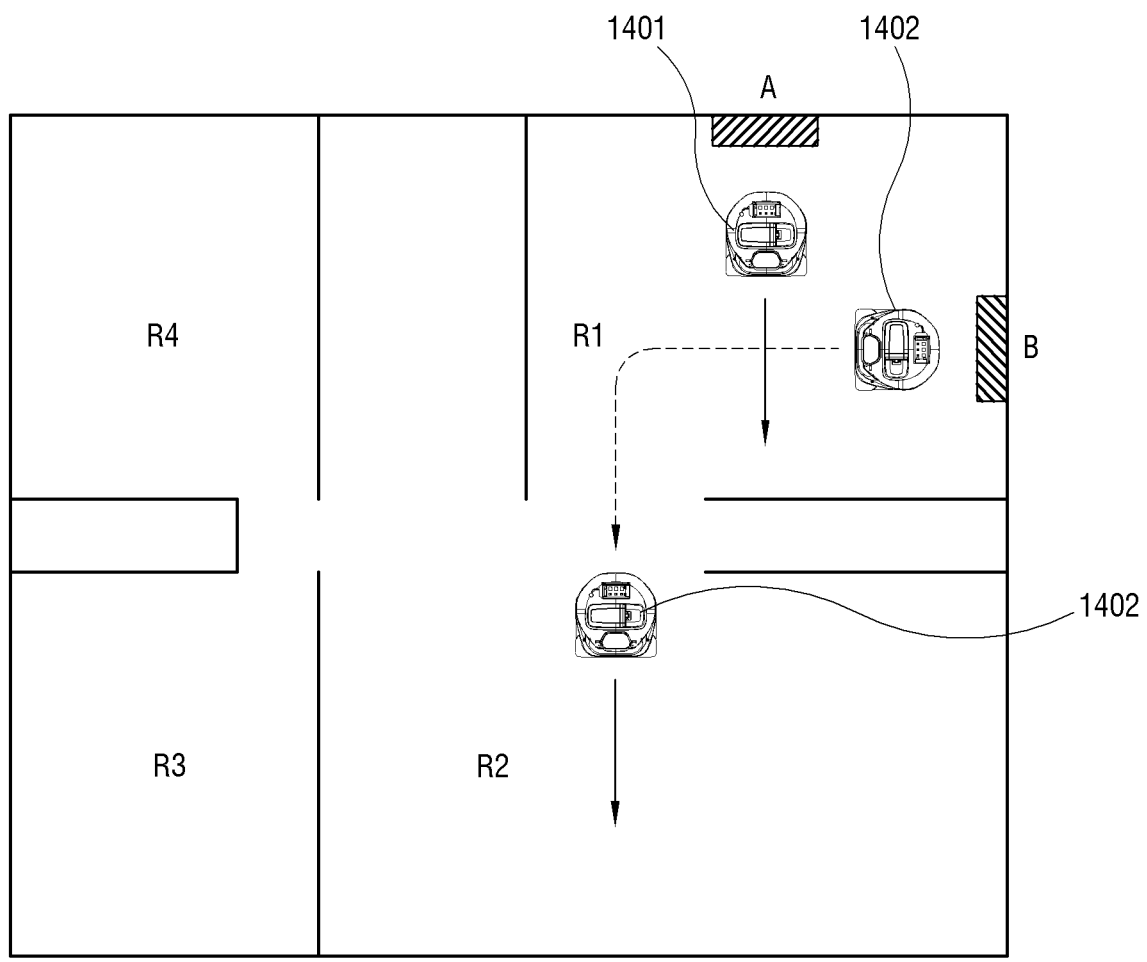

In this case, as shown in FIG. 14, a cleaning robot A 1401 having higher priority cleans the individual cleaning region R1, and a cleaning robot B 1402 is controlled to move to another near region, e.g. the individual cleaning region R2 and perform a clean. Here, the cleaning robot B 1402 may be controlled to move to a region R2 close to the region R1 and perform a clean.

Figure 15:
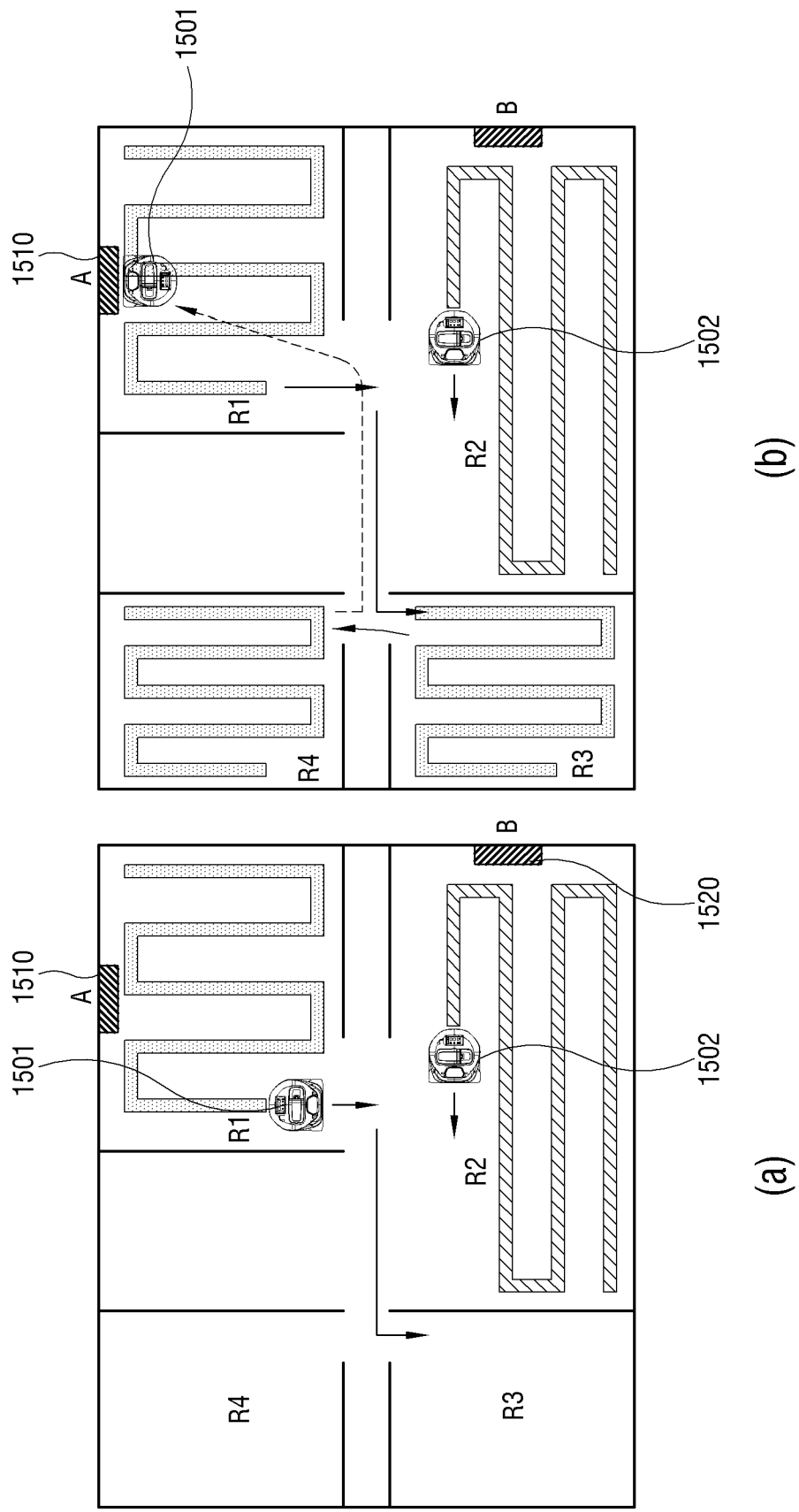

Then, as shown in (a) of FIG. 15, when a cleaning robot A 1501 finishes the clean for the individual cleaning region R1, the cleaning robot A 1501 is controlled to move to another region except a region R2 being cleaned by a cleaning robot B 1502, for example, to an individual cleaning region R3 and perform a clean. Further, as shown in (b) of FIG. 15, when the clean for the individual cleaning regions R3 is finished, the cleaning robot A 1501 is controlled to move to an individual cleaning regions R4 except R1, R2 and R3 and perform a clean.

When the cleaning robot A 1501 finishes the clean for the individual cleaning region R4, the cleaning robot A 1501 may be controlled to return to the start location A at which the charging station is located as shown in (b) of FIG. 15 or perform a collaborative clean for another cleaning region. Here, the cleaning robot A 1501 is controlled to return to the charging station or perform a collaborative clean for the individual cleaning region R2, based on a cleaning progress of the cleaning robot B 1502 performing the collaborative clean.

Figure 16:
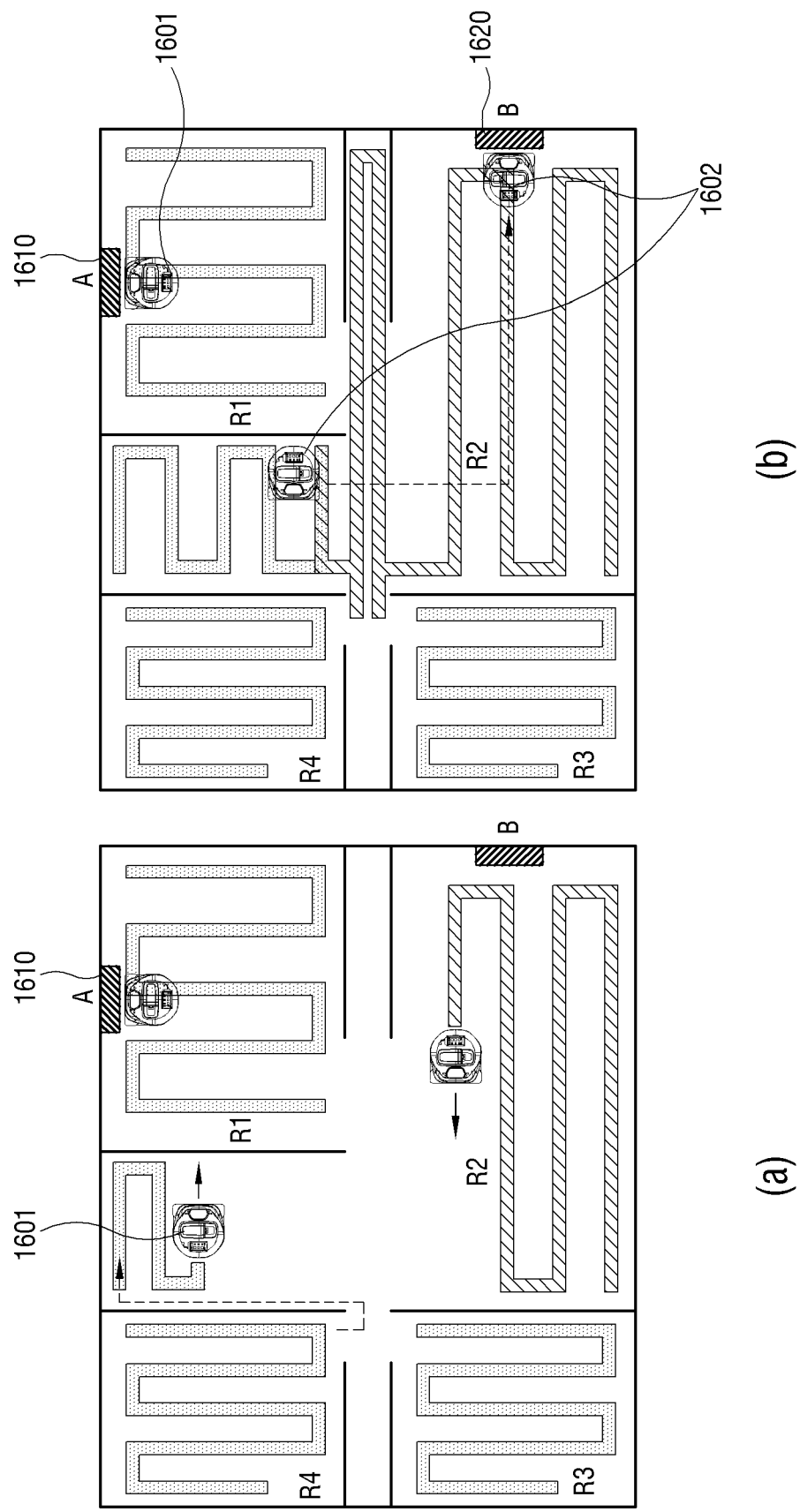

Specifically, when a cleaning robot B 1602 cleans less than 50% of the individual cleaning region R2, i.e. when there remains 50% or more of the region R2 to be cleaned, as shown in (a) of FIG. 16 a cleaning robot A 1601 is controlled to move to the individual cleaning region R2 and perform a collaborative clean for the individual cleaning region R2.

Thus, as shown in (b) of FIG. 16, the cleaning robot A 1601 and the cleaning robot B 1602 perform the collaborative clean for cleaning the individual cleaning region R2 together. In this process, regions to be cleaned by the two cleaning robots 1601 and 1602 may be partially overlapped. Here, the overlapped region may be controlled to be less than 10% of the individual cleaning region R2.

Alternatively, when there remains less than 50% of the individual cleaning region R2 to be cleaned by the cleaning robot B 1602, the cleaning robot A 1601 may immediately return to the charging station as described with reference to (b) of FIG. 15.

In the foregoing fifth embodiment, the cleaning robots are different in priority, and a cleaning robot given higher priority is more preferentially assigned to a predetermined individual cleaning region than other cleaning robots, and controlled to perform a clean. When the clean for the individual cleaning region assigned with the cleaning robot is finished, the cleaning robot moves to another individual cleaning region in which the clean is unfinished, and performs a clean. Further, two or more cleaning robots are controlled to perform the collaborative clean so that one individual cleaning region can be cleaned by both two cleaning robots at a time, according to cleaned conditions of the region to which another cleaning robot is assigned.

Below, a method of controlling a collaborative clean with a plurality of cleaning robots according to the embodiments of the disclosure will be described with reference to FIG. 17.

Figure 17:
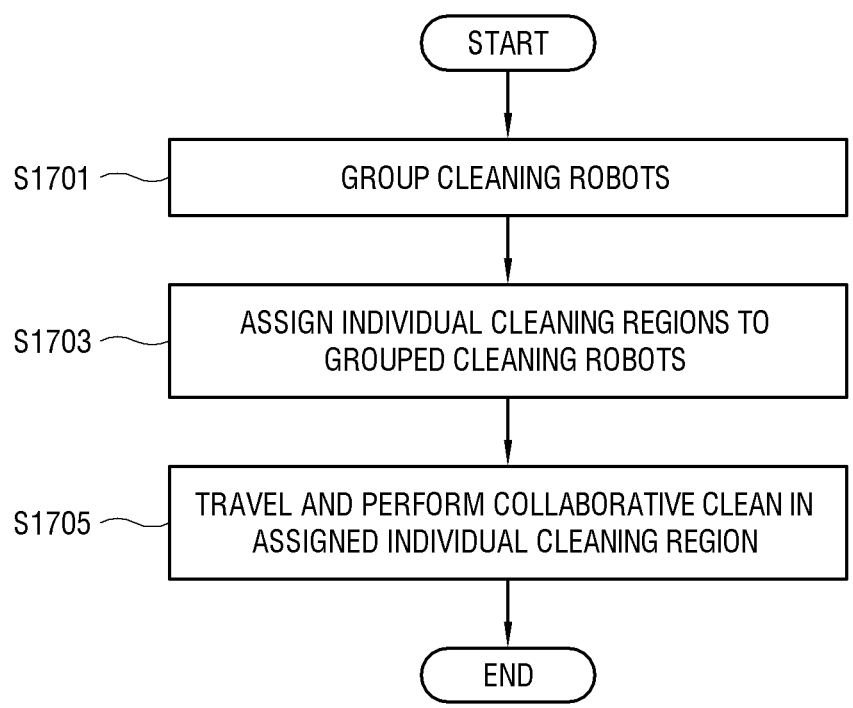
FIG. 17 is a flowchart of a method of controlling a collaborative clean according to an embodiment of the disclosure.

FIG. 17 is a flowchart of a method of controlling a collaborative clean according to an embodiment of the disclosure.

As shown in FIG. 17, according to an embodiment of the disclosure, a plurality of cleaning robots 100, 101, . . . , 102 are grouped to perform a collaborative clean (S1701). Here, grouping is applied to the plurality of cleaning robots which can communicate with one another.

At operation S1701, the plurality of grouped cleaning robots 100, 101, . . . , 102 is assigned with the individual cleaning regions (S1703). Here, the assignment of the individual cleaning regions may be achieved based on a user input to the terminal apparatus 300 capable of communicating with the plurality of cleaning robots 100, 101, . . . , 102, or may be automatically achieved based on the current location information of the cleaning robots 100, 101, . . . , 102. Further, the locations of the cleaning robots 100, 101, . . . , 102 may be fixed to the locations of the charging station, or may be flexible. When the location of the cleaning robot is flexible, the processor 190 of the cleaning robot may identify its own current location. In this operation, it is possible to use a map generated based on data obtained by the detector 150. In a case of using the map, the current locations of the plurality of cleaning robots are mapped on the map.

A user may input a command, which is issued to perform the collaborative clean, through the UI 160 or the like provided in one cleaning robot or the terminal apparatus 300. In response to the command, the plurality of cleaning robots 100, 101, . . . , 102 performs a collaborative clean while travelling in the individual cleaning region assigned in the operation S1703 (S1705). Here, the plurality of cleaning robots 100, 101, . . . , 102 may be previously set to be given priority, and the cleaning robot having higher priority may be controlled to perform cleaning in a predetermined individual cleaning region. Such priority may be set by a user through the UI 160 of a predetermined cleaning robot or the terminal apparatus 300, or may be automatically set. Further, the cleaning robot which finishes cleaning the individual cleaning region assigned thereto may move to and clean another region of which the cleaning is unfinished. In this process, the region assigned to another cleaning robot is collaboratively cleaned, and thus some regions are overlappingly cleaned by two or more cleaning robots.

As described above, according to various embodiments of the disclosure, the plurality of cleaning robots are assigned to the individual cleaning regions based on their location information, and controlled to perform the collaborative clean for the assigned regions, thereby shortening a total cleaning time and efficiently performing a clean.

Although a few exemplary embodiments have been shown and described, it will be appreciated that changes may be made in these exemplary embodiments without departing from the scope defined in the appended claims.

The invention claimed is:

1. A moving apparatus for cleaning, comprising:
a cleaner configured to perform cleaning;
a traveler configured to move the moving apparatus;
a communicator configured to communicate with an external apparatus;
a detector to detect an environment around the moving apparatus; and
a processor configured to:
generate a first map based on data obtained from the detector,
receive, via the communicator, a second map from at least one different moving apparatus,
generate a merged map by merging the first map and the second map, the merged map representing a whole cleaning region,
map current locations of the moving apparatus and the at least one different moving apparatus on the merged map,
identify an individual cleaning region corresponding to the moving apparatus among a plurality of individual cleaning regions assigned to the moving apparatus and the at least one different moving apparatus based on the current locations throughout the merged map representing the whole cleaning region, based on information received through the communicator, and
control the traveler and the cleaner to travel and clean the identified individual cleaning region.

2. The moving apparatus according to claim 1, wherein each current location of the moving apparatus and the at least one different moving apparatus corresponds to a location of a charging station.

3. The moving apparatus according to claim 1, wherein the processor is configured to identify the current locations of the moving apparatus based on data obtained by the detector for detecting the environment around the moving apparatus.

4. The moving apparatus according to claim 1, wherein the processor is configured to generate the merged map based on a matching pattern between the first map and the second map.

5. The moving apparatus according to claim 1, wherein the processor is configured to control the traveler so that the moving apparatus is enabled to move to and clean another individual cleaning region based on a finished clean of the identified individual cleaning region.

6. A collaborative cleaning system comprising:
a plurality of moving apparatuses for cleaning, the plurality of moving apparatuses comprising a first moving apparatus and at least one different moving apparatus; and
a terminal apparatus comprising:
a communicator configured to communicate with the plurality of moving apparatuses; and
a processor configured to
obtain a first map based on data obtained by the first moving apparatus via the communicator,
obtain a second map based on data obtained by the at least one different moving apparatus via the communicator,
generate a merged map by merging the first map and the second map, the merged map representing a whole cleaning region,
map current locations of the plurality of moving apparatuses on the merged map,
assign a plurality of individual cleaning regions based on the current locations of the plurality of moving apparatuses, throughout the merged map representing the whole cleaning region, based on information received through the communicator, and
control a command, which is issued to clean the plurality of individual cleaning regions assigned to the plurality of moving apparatuses, to be transmitted through the communicator.

7. The collaborative cleaning system according to claim 6, wherein
the terminal apparatus further comprises a display configured to display a user interface (UI), and
the processor is configured to control the plurality of individual cleaning regions to be assigned to the plurality of moving apparatuses based on a user input to the UI.

8. The collaborative cleaning system according to claim 7, wherein the UI comprises a plurality of items to input a setting value for assigning the individual cleaning regions to the plurality of moving apparatuses.

9. The collaborative cleaning system according to claim 6, wherein the processor is configured to display the merged map of the whole cleaning region on a display, and assign the plurality of individual cleaning regions to the plurality of moving apparatuses based on a user input to the displayed merged map.

10. The collaborative cleaning system according to claim 6, wherein the processor is configured to generate the merged map based on a matching pattern between the first map and the second map.

11. The collaborative cleaning system according to claim 6, wherein the processor is configured to receive location information from the plurality of moving apparatuses through the communicator, and control a display to map and display the received location information on the merged map.

12. The collaborative cleaning system according to claim 6, wherein
a display is configured to display a UI to set priority with regard to the plurality of moving apparatuses for cleaning, and
the processor is configured to transmit priority information set through the UI to a matching moving apparatus through the communicator.

13. A collaborative clean control method of a plurality of moving apparatuses for cleaning, the plurality of moving apparatuses being enabled to communicate with one another, the collaborative clean control method comprising:
generating a first map based on data obtained by a first moving apparatus from among the plurality of moving apparatuses via a communicator, first data being regarding an environment around the first moving apparatus;
generating a second map based on data obtained by a second moving apparatus from among the plurality of moving apparatuses via the communicator, second data being regarding an environment around the second moving apparatus;
generating a merged map by merging the first map and the second map, the merged map representing a whole cleaning region;
mapping current locations of the plurality of moving apparatuses on the merged map;
assigning a plurality of individual cleaning regions to the plurality of moving apparatuses based on the current locations in the merged map; and
allowing the plurality of moving apparatuses to travel and clean the assigned plurality of individual cleaning region.

14. A moving apparatus for cleaning, comprising:
a cleaner configured to perform cleaning;
a traveler configured to move the moving apparatus;
a communicator configured to communicate with an external apparatus; and
a processor configured to:
identify an individual cleaning region corresponding to the moving apparatus among a plurality of individual cleaning regions assigned to the moving apparatus and at least one different moving apparatus based on current locations throughout a whole cleaning region, based on information received through the communicator, and
control the traveler and the cleaner to travel and clean the identified individual cleaning region,
wherein the processor is configured to
identify a relative location indicating a distance and an orientation of the moving apparatus to another moving apparatus,
based on the moving apparatus and the other moving apparatus being located within a range shorter than a predetermined distance, identify the individual cleaning region so that the moving apparatus and the another moving apparatus perform cleaning while traveling in a direction away from each other and control the traveler and the cleaner to travel and clean the identified individual cleaning region.

15. A collaborative cleaning system comprising:
a plurality of moving apparatuses for cleaning; and
a terminal apparatus comprising:
a communicator configured to communicate with the plurality of moving apparatuses; and
a processor configured to
assign a plurality of individual cleaning regions based on current locations of the plurality of moving apparatuses, throughout a whole cleaning region, based on information received through the communicator, and
control a command, which is issued to clean the individual cleaning regions assigned to the plurality of moving apparatuses, to be transmitted through the communicator,
wherein the processor is configured to
identify a relative location indicating a distance and an orientation of a moving apparatus from among the plurality of moving apparatuses to another moving apparatus,
based on the moving apparatus and the other moving apparatus being located within a range shorter than a predetermined distance, assign the individual cleaning region so that the moving apparatus and the another moving apparatus perform cleaning while traveling in a direction away from each other and control the command to travel and clean the identified individual cleaning region to be transmitted through the communicator.

16. A collaborative clean control method of a plurality of moving apparatuses for cleaning, the plurality of moving apparatuses being enabled to communicate with one another, the collaborative clean control method comprising:
assigning a plurality of individual cleaning regions to the plurality of moving apparatuses based on current locations; and
allowing the plurality of moving apparatuses to travel and clean the assigned individual cleaning region,
wherein the collaborative clean control method further comprising identifying a relative location indicating a distance and an orientation of a moving apparatus from among the plurality of moving apparatuses to another moving apparatus, and wherein the assigning the plurality of individual cleaning regions comprises, based on the moving apparatus and the other moving apparatus being located within a range shorter than a predetermined distance, assigning the individual cleaning region so that the moving apparatus and the another moving apparatus perform cleaning while traveling in a direction away from each other.

* * * * *